(12) United States Patent
Yamamura et al.

(10) Patent No.: US 7,779,168 B2
(45) Date of Patent: Aug. 17, 2010

(54) INFORMATION PROCESSING APPARATUS, INFORMATION PROCESSING METHOD, AND COMPUTER-READABLE MEMORY MEDIUM STORING PROGRAM FOR REALIZING THE METHOD

(75) Inventors: Shinichi Yamamura, Kanagawa (JP); Yoshihiro Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 11/779,268

(22) Filed: Jul. 17, 2007

(65) Prior Publication Data
US 2008/0005373 A1 Jan. 3, 2008

Related U.S. Application Data

(62) Division of application No. 10/626,588, filed on Jul. 25, 2003, now Pat. No. 7,287,253.

(30) Foreign Application Priority Data

Jul. 26, 2002 (JP) ............................. 2002-218130
Jul. 26, 2002 (JP) ............................. 2002-218134

(51) Int. Cl.
*G06F 13/12* (2006.01)
(52) U.S. Cl. ............................. 710/8; 710/63; 710/62; 358/1.13
(58) Field of Classification Search ................. 710/62, 710/63, 8; 717/176; 358/1.13, 1.18
See application file for complete search history.

(56) References Cited

U.S. PATENT DOCUMENTS

| | | | |
|---|---|---|---|
| 5,815,722 A | | 9/1998 | Kalwitz et al. ............... 717/178 |
| 6,138,178 A | * | 10/2000 | Watanabe ....................... 710/8 |
| 6,393,495 B1 | | 5/2002 | Flory et al. ................... 719/327 |
| 6,441,920 B1 | * | 8/2002 | Smith ........................... 358/1.2 |
| 6,615,298 B2 | * | 9/2003 | Ellis et al. ..................... 710/63 |
| 6,633,929 B1 | * | 10/2003 | Hyder et al. .................. 710/62 |
| 6,665,735 B1 | * | 12/2003 | Tanaka et al. ................ 719/331 |
| 6,772,420 B1 | | 8/2004 | Poger et al. .................. 719/327 |
| 6,804,233 B1 | | 10/2004 | Congdon et al. ............ 370/389 |

(Continued)

FOREIGN PATENT DOCUMENTS

WO 0101252 1/2001

OTHER PUBLICATIONS

Configuration Management for Distributed Applications Management, Hanan L. Lutfiyya et al., IBM, pp. 1-15.

(Continued)

*Primary Examiner*—Niketa I Patel
*Assistant Examiner*—Ernest Unelus
(74) *Attorney, Agent, or Firm*—Fitzpatrick, Cella, Harper & Scinto

(57) ABSTRACT

An information processing apparatus installs a first control program corresponding to a first peripheral device and a second control program for controlling a second peripheral device, the first and second control programs including a common module. The information processing apparatus has deciding means for deciding identification information of the common module so that the identification information of the common module which operates as a part of the first control program and the identification information of the common module which operates as a part of the second control program are made different.

15 Claims, 27 Drawing Sheets

U.S. PATENT DOCUMENTS

| | | | | |
|---|---|---|---|---|
| 2001/0026281 | A1 | 10/2001 | Takagi | 345/590 |
| 2002/0159079 | A1* | 10/2002 | Kuroi | 358/1.9 |
| 2003/0160988 | A1* | 8/2003 | Chapin et al. | 358/1.13 |
| 2003/0160989 | A1* | 8/2003 | Chapin et al. | 358/1.13 |
| 2003/0189718 | A1 | 10/2003 | Yamamura | 358/1.13 |
| 2003/0231328 | A1* | 12/2003 | Chapin et al. | 358/1.13 |
| 2003/0231329 | A1* | 12/2003 | Edmonds et al. | 358/1.13 |
| 2005/0141512 | A1* | 6/2005 | Jeffrey et al. | 370/395.2 |

OTHER PUBLICATIONS

Using Shim Technology to Monitor DCE Runtime Performance, Gregory M. Oster t al., pp. 1-14.

Fast Detection of Communication patterns in Distributed Executions, Thomas Kunz et al., pp. 1-13.

Anderson, Rick, "The End of DLL Hell", Microsoft Corp., http://msdn2.microsoft.com/en-us/library/ms811694(d+printer)aspx, XP 007902262, Sep. 5, 2007.

D'Souza et al., "Implementing Side-by-Side Component Sharing in Applications (Expanded)", Microsoft Corp., http://msdn2.microsoft.com/en-us/library/ms811700(d+printer)aspx, XP 007902263, Sep. 5, 2007.

"Wiindows File Protection and Windows", Microsoft Corp., http://www.microsoft.com/whdc/winlogo/drvsign/wfp.mspx, XP-002294085, Aug. 27, 2004.

Anderson, Rick, "The End of DLL Hell", Microsoft Corp., 2000, XP 007902262, <http://msdn2.microsoft.com/en-us/library/ms811694(d=printer).aspx>, [Retrieved on Sep. 5, 2007].

D'Souza et al., "Implementing Side-by-Side Component Sharing in Applications (Expanded)", Microsoft Corp., 1999, XP 007902263, <http://msdn2.microsoft.com/en-us/library/ms811700(d=printer).aspx>, [Retrieved on Sep. 5, 2007].

"Wiindows File Protection and Windows", Microsoft Corp., 2001, XP-002294085, <http://www.microsoft.com/whdc/winlogo/drvsign/wfp.mspx>, [Retrieved on Aug. 27, 2004].

* cited by examiner

FIG. 1
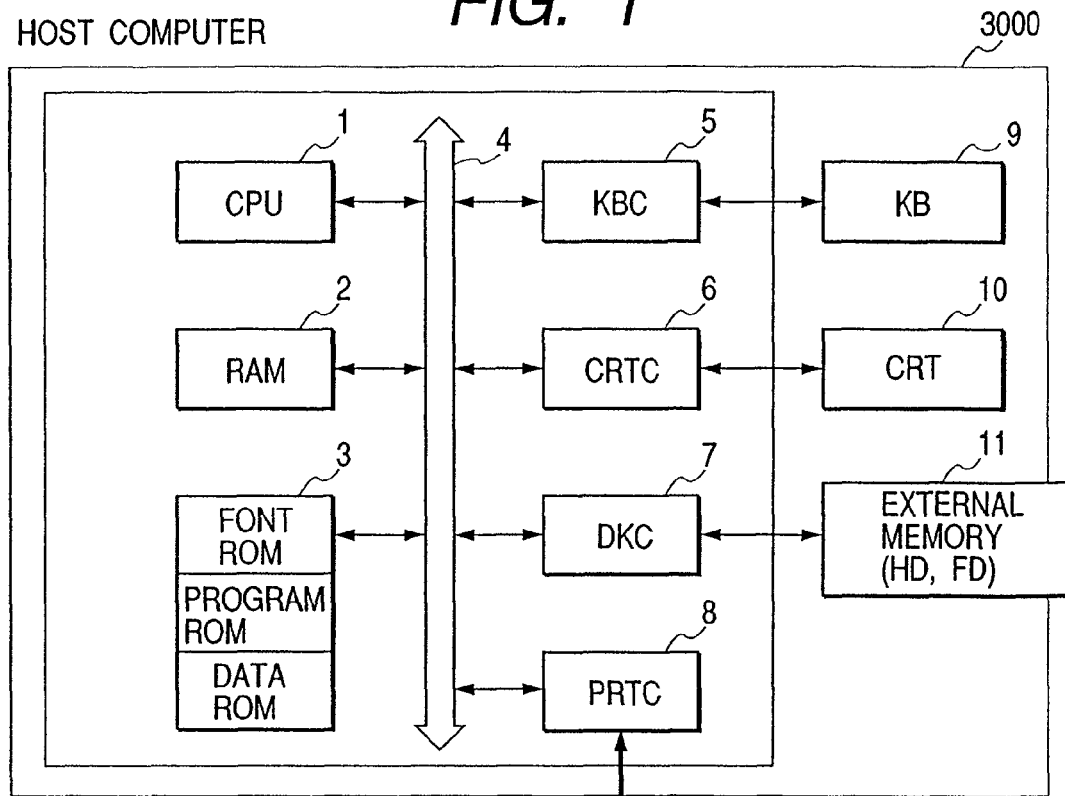
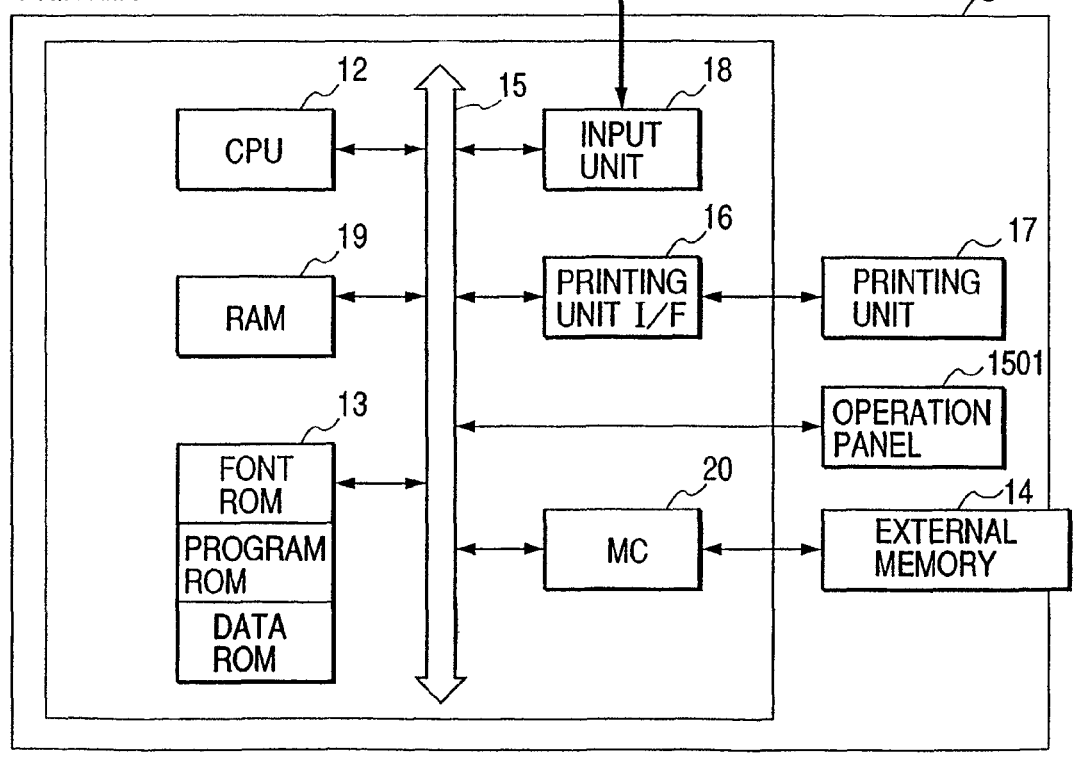

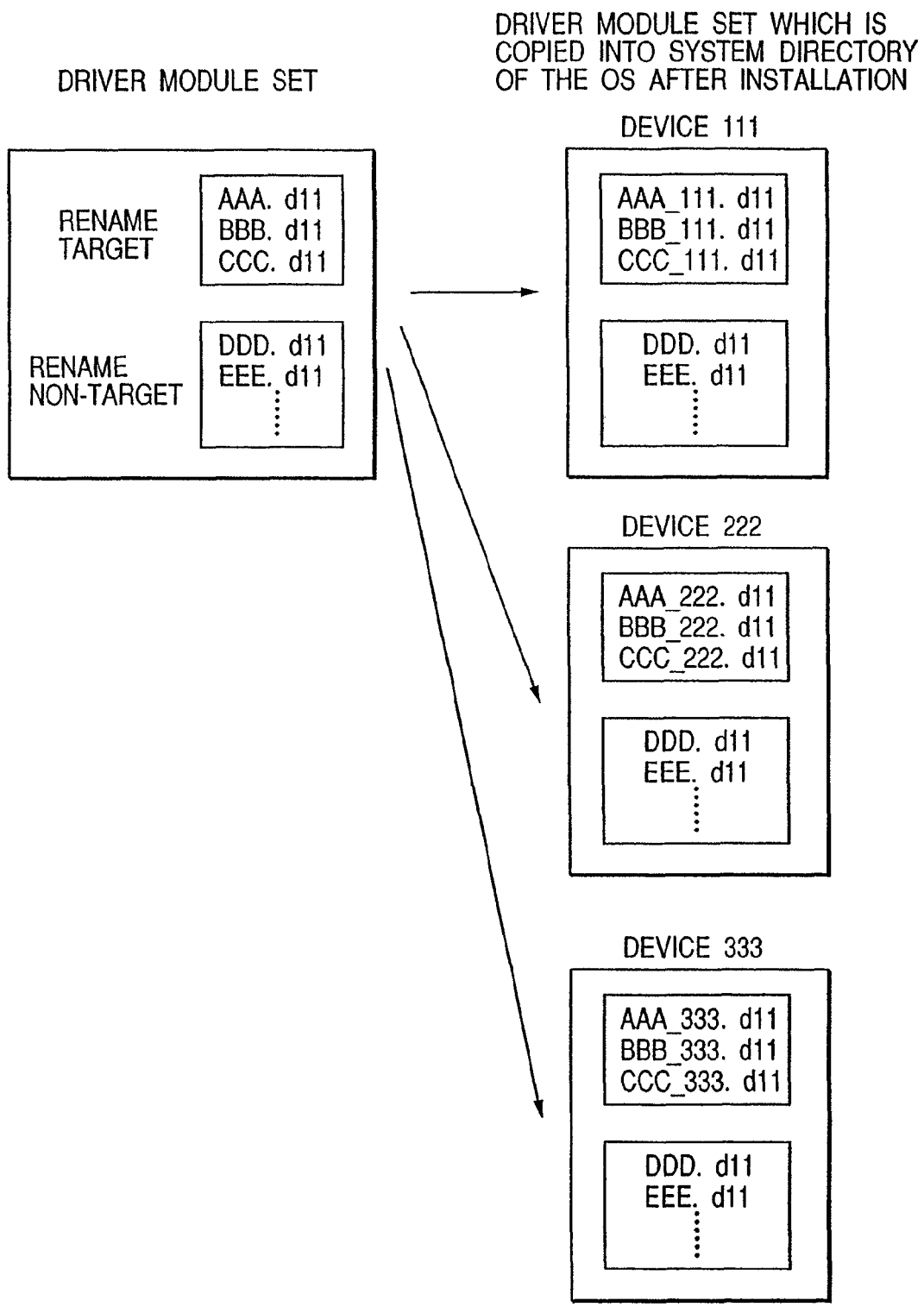

FIG. 5

| MODEL NAME(UK) | CRC |
|---|---|
| PrinterMakerA iR1600-2000 PCL5e | F0E5 |
| PrinterMakerA iR2200-3300 PCL5e | 617E |
| PrinterMakerA iR400 PCL5e | CA5C |
| PrinterMakerA iR5000-6000 PCL5e | 9926 |
| PrinterMakerA iR5000-6000-L1 PCL5e | 1579 |
| PrinterMakerA iR7200 PCL5e | FAEA |
| PrinterMakerA iR7200-M1 PCL5e | D6F1 |
| PrinterMakerA iR7200-M2 PCL5e | D6C0 |
| PrinterMakerA iR8500 PCL5e | E287 |
| PrinterMakerA iR8500-M1 PCL5e | 0BB2 |
| PrinterMakerA iR8500-M2 PCL5e | 0B81 |
| PrinterMakerA iR105 PCL5e | 9A36 |
| PrinterMakerA iR105-M1 PCL5e | CE19 |
| PrinterMakerA iR105-M2 PCL5e | CE2A |
| PrinterMakerA GP160 PCL5e | F2E7 |
| PrinterMakerA GP200-215 PCL-P3/B1 | BEEF |
| PrinterMakerA GP200-225 PCL | 5DEF |
| PrinterMakerA GP300-405 PCL | 9AD5 |
| PrinterMakerA GP555-605-605P PCL | 080B |
| PrinterMakerA LBP-1000 PCL5e | 49EB |
| PrinterMakerA LBP-1760/1760e PCL5e | DF39 |
| PrinterMakerA LBP-2000 PCL5e | 441B |
| PrinterMakerA LBP-3260 PCL5e | 09AA |

FIG. 6

| FIG. 6A |
|---------|
| FIG. 6B |

FIG. 6A

```
; PrinterMakerA PCL5e Printer INF for Windows 2000/XP
; Copyright PrinterMakerA INC.2002 All Rights Reserved
;(CD-ROM Release)
; W2KPCL5E.INF

[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR85000059D
"PrinterMakerA LBP-2000 PCL5e"
= LB2000_UK,LPTENUM#PrinterMakerALBP-2000113E,
USBPRINT#PrinterMakerALBP-2000113E,PrinterMakerALBP-2000113E

[IR_8500UK]
CopyFiles=IR8500PK,NT_P5,HELP_UK,NT_P5_DCIA,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_UK]
CopyFiles=LB2000PK,NT_P5,HELP_UK,NT_P5_DCIA,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

; !Identification #  PCL5e UK
; iR8500    : E287
; ;LBP-2000 : 441B

[IR8500]
IR8500PK.XPD
CNP5EE_E287.DLL CNP5EE.DLL
CNP5EEUI_E287.DLL   CNP5EEUI.DLL
CNP5E809_E287.DLL   CNP5E809.DLL

[IR8500_DATA]
DriverFile=CNP5EE_E287.DLL
ConfigFile=CNP5EEUI_E287.DLL
HelpFile=CNP5EE.HLP

[LB2000]
LB2000PK.XPD
CNP5EE_441B.DLL CNP5EE.DLL
CNP5EEUI_441B.DLL CNP5EEUI.DLL

[LB2000_DATA]
DriverFile=CNP5EE_441B.DLL
ConfigFile=CNP5EEUI_441B.DLL
HelpFile=CNP5EE.HLP

[DestinationDirs]
DefaultDestDir=66000
NT_PCOM_UK=66000
NS_CPCA=66002
DRVCOPY=66000
```

FROM FIG. 6A

[NT_P5]
CNXPRASX.DLL
AUSSDRV.DLL

[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CFINE32.DLL
CNXCFV32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020

[SourceDisksFiles]
CNP5EE.DLL = 1
CNP5EEUI.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCFV32.DLL = 1
CPCEDIT.DLL = 1
CPCQM809.CNT = 1
CPCQM809.HLP = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1
AUSSDRV.DLL = 1
AUSSAPI.DAT = 1
NBAPI.DLL = 1
NBIPC.DLL = 1
AUCPLMNT.DLL = 1

[SourceDisksNames]
1=%DISK1%,,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"

| FIG. 7A |
|---------|
| FIG. 7B |

FIG. 7A

```
[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR8500059D
"PrinterMakerA LBP-2000 PCL5e"
= LB2000_UK,LPTENUM#PrinterMakerALBP-2000113E, USBPRINT#PrinterMakerALBP-2000113E,PrinterMakerALBP-2000113E

[IR8500_UK]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_UK]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"

[NT_P5]
CNXPRASX.DLL
AUSSDRV.DLL
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

; Identification #  PCL5e UK
; iR8500    : E287
; LBP-2000  : 441B
[IR8500]
IR8500PK.XPD
CNP5EE_E287.DLL    CNP5EE.DLL
CNP5EEUI_E287.DLL  CNP5EEUI.DLL
CNP5EEUM_E287.DLL  CNP5EEUM.DLL
CNP5E809_DE287.DLL CNP5E809.DLL

[IR8500_DATA]
DriverFile=CNP5EE_E287.DLL
ConfigFile=CNP5EEUI_E287.DLL
UserModeDriver=CnP5eEUM_E287.DLL
HelpFile=CNP5EE.HLP

[LB2000]
LB2000PK.XPD
CNP5EE_441B.DLL    CNP5EE.DLL
CNP5EEUI_441B.DLL  CNP5EEUI.DLL
CNP5EEUM_441B.DLL  CNP5EEUM.DLL

[LB2000_DATA]
DriverFile=CNP5EE_D441B.DLL
ConfigFile=CNP5EEUI_D441B.DLL
UserModeDriver=CnP5eEUM_D441B.DLL
HelpFile=CNP5EE.HLP

[DestinationDirs]
DefaultDestDir=66000
NT_PCOM_UK=66000
NS_CPCA=66002
DRVCOPY=66000
```

FROM FIG. 7A

[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CFINE32.DLL
CNXCPV32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020

[SourceDisksFiles]
CNP5EE.DLL = 1
CNP5EEUI.DLL = 1
CnP5eEUM.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCPV32.DLL = 1
CPCEDIT.DLL = 1
CPCQM809.CNT = 1
CPCQM809.HLP = 1
CPCVIEW.EXE = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1

[SourceDisksNames]
1=%DISK1%,,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"

FIG. 8

NECESSITY OF REACTIVATION OF SYSTEM AFTER INSTALLATION

| DRIVER INSTALLED IN SYSTEM | | DRIVER TO BE ADDED | | DRIVERS IN SYSTEM AFTER ADDITION | NECESSITY OF REACTIVATION |
|---|---|---|---|---|---|
| Ver 5.30<br>iR8500 PCL5e | + | Ver 5.30<br>iR8500 PCL5e | = | Ver 5.30 — iR8500 PCL5e / Ver 5.30 — iR8500 PCL5e | UNNECESSARY |
| | + | Ver 5.30<br>iR8500 PCL5e | = | Ver 5.30<br>iR8500 PCL5e | NECESSARY |
| | + | Ver 5.40<br>iR7200 PCL5e | = | Ver 5.30 — iR8500 PCL5e / Ver 5.40 — iR7200 PCL5e | UNNECESSARY |
| | + | Ver 5.40<br>iR8500 PCL5e | = | Ver 5.40<br>iR8500 PCL5e | NECESSARY |

FIG. 9

| MODEL NAME | DRIVER FILE NAME | DRIVER FILE NAME AFTER RENAMING |
|---|---|---|
| PrinterMakerA iR1600-2000 PCL5e | CNP5EE.DLL | CNP5EE_PrinterMakerA iR1600-2000 PCL5e.DLL |
| PrinterMakerA iR2200-3300 PCL5e | CNP5EE.DLL | CNP5EE_PrinterMakerA iR2200-3300 PCL5e.DLL |
| PrinterMakerA iR400 PCL5e | CNP5EE.DLL | CNP5EE_PrinterMakerA iR400 PCL5e.DLL |
| PrinterMakerA iR5000-6000 PCL5e | CNP5EE.DLL | CNP5EE_PrinterMakerA iR5000-6000 PCL5e.DLL |
| PrinterMakerA iR5000-6000-L1 PCL5e | CNP5EE.DLL | CNP5EE_PrinterMakerA iR5000-6000-L1 PCL5e.DLL |
| PrinterMakerA iR7200 PCL5e | CNP5EE.DLL | CNP5EE_PrinterMakerA iR7200 PCL5e.DLL |
| PrinterMakerA iR7200-M1 PCL5e | CNP5EE.DLL | CNP5EE_PrinterMakerA iR7200-M1 PCL5e.DLL |
| PrinterMakerA iR7200-M2 PCL5e | CNP5EE.DLL | CNP5EE_PrinterMakerA iR7200-M2 PCL5e.DLL |
| PrinterMakerA iR8500 PCL5e | CNP5EE.DLL | CNP5EE_PrinterMakerA iR8500 PCL5e.DLL |
| PrinterMakerA iR8500-M1 PCL5e | CNP5EE.DLL | CNP5EE_PrinterMakerA iR8500-M1 PCL5e.DLL |
| PrinterMakerA iR8500-M2 PCL5e | CNP5EE.DLL | CNP5EE_PrinterMakerA iR8500-M2 PCL5e.DLL |
| PrinterMakerA iR105 PCL5e | CNP5EE.DLL | CNP5EE_PrinterMakerA iR105 PCL5e.DLL |
| PrinterMakerA iR105-M1 PCL5e | CNP5EE.DLL | CNP5EE_PrinterMakerA iR105-M1 PCL5e.DLL |
| PrinterMakerA iR105-M2 PCL5e | CNP5EE.DLL | CNP5EE_PrinterMakerA iR105-M2 PCL5e.DLL |
| PrinterMakerA GP160 PCL5e | CNP5EE.DLL | CNP5EE_PrinterMakerA GP160 PCL5e.DLL |
| PrinterMakerA GP200-215 PCL-P3/B1 | CNP5EE.DLL | CNP5EE_PrinterMakerA GP200-215 PCL-P3-B1.DLL |
| PrinterMakerA GP200-225 PCL | CNP5EE.DLL | CNP5EE_PrinterMakerA GP200-225 PCL.DLL |
| PrinterMakerA GP300-405 PCL | CNP5EE.DLL | CNP5EE_PrinterMakerA GP300-405 PCL.DLL |
| PrinterMakerA GP555-605-605P PCL | CNP5EE.DLL | CNP5EE_PrinterMakerA GP555-605-605P PCL.DLL |
| PrinterMakerA LBP-1000 PCL5e | CNP5EE.DLL | CNP5EE_PrinterMakerA LBP-1000 PCL5e.DLL |
| PrinterMakerA LBP-1760/1760e PCL5e | CNP5EE.DLL | CNP5EE_PrinterMakerA LBP-1760-1760e PCL5e.DLL |
| PrinterMakerA LBP-2000 PCL5e | CNP5EE.DLL | CNP5EE_PrinterMakerA LBP-2000 PCL5e.DLL |
| PrinterMakerA LBP-3260 PCL5e | CNP5EE.DLL | CNP5EE_PrinterMakerA LBP-3260 PCL5e.DLL |

FIG. 10

| FIG. 10A |
|----------|
| FIG. 10B |

FIG. 10A

```
; PrinterMakerA PCL5e Printer INF for Windows 2000/XP
; Copyright PrinterMakerA INC.2002 All Rights Reserved
; (CD-ROM Release)
; W2KPCL5E.INF

[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR85000059D
"PrinterMakerA LBP-2000 PCL5e"
= LB2000_UK,LPTENUM#PrinterMakerALBP-2000113E,
USBPRINT#PrinterMakerALBP-2000113E,PrinterMakerALBP-2000113E

[IR8500]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM_URLS]
%PrinterMakerA% =
"http://www.PrinterMakerA.com/support/index.html?model=%model%"
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

; Identification #  PCL5e UK
; iR8500      : E287
; LBP-2000 : 441B

[IR8500_FILES]
IR8500PK.XPD
"CNP5EE_PrinterMakerA iR8500 PCL5e.DLL"   CNP5EE.DLL
"CNP5EEUI_PrinterMakerA iR8500 PCL5e.DLL"  CNP5EEUI.DLL
"CNP5E809_PrinterMakerA iR8500 PCL5e.DLL"  CNP5E809.DLL

[IR8500_DATA]
DriverFile="CNP5EE_PrinterMakerA iR8500 PCL5e.DLL"
ConfigFile="CNP5EEUI_PrinterMakerA iR8500 PCL5e.DLL"
HelpFile=CNP5EE.HLP

[LB2000_FILES]
LB2000PK.XPD
"CNP5EE_PrinterMakerA LBP-2000 PCL5e.DLL"   CNP5EE.DLL
"CNP5EEUI_PrinterMakerA LBP-2000 PCL5e.DLL"  CNP5EEUI.DLL

[LB2000_DATA]
DriverFile="CNP5EE_PrinterMakerA LBP-2000 PCL5e.DLL"
ConfigFile="CNP5EEUI_PrinterMakerA LBP-2000 PCL5e.DLL"
HelpFile=CNP5EE.HLP

[DestinationDirs]
DefaultDestDir=66000
NT_PCOM_UK=66002
NS_CPCA=66000
DRVCOPY=66000
```

TO FIG. 10B

FROM FIG. 10A

*FIG. 10B*

[NT_P5]
CNXPRASX.DLL
AUSSDRV.DLL

[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CNXCPV32.DLL
CFINE32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020

[SourceDisksFiles]
CNP5EE.DLL = 1
CNP5EEUI.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCPV32.DLL = 1
CPCEDIT.DLL = 1
CPCQM809.CNT = 1
CPCQM809.HLP = 1
CPCVIEW.EXE = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1
AUSSDRV.DLL = 1
AUSSAPI.DAT = 1
NBAPI.DLL = 1
NBIPC.DLL = 1
AUCPLMNT.DLL = 1

[SourceDisksNames]
1=%DISK1%,,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"

| FIG. 11A |
|----------|
| FIG. 11B |

FIG. 11A

```
[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR8500059D
"PrinterMakerA LBP-2000 PCL5e"
= LB2000_UK,LPTENUM#PrinterMakerALBP-2000113E,
USBPRINT¥PrinterMakerALBP-2000113E,PrinterMakerALBP-2000113E

[IR8500_]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"

[NT_P5]
CNXPRASX.DLL
AUSSDRV.DLL
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

[IR8500_FILES]
IR8500PK.XPD
"CNP5EE_PrinterMakerA iR8500 PCL5e.DLL"    CNP5EE.DLL
"CNP5EEUI_PrinterMakerA iR8500 PCL5e.DLL"  CNP5EEUI.DLL
"CNP5EEUM_PrinterMakerA iR8500 PCL5e.DLL"  CNP5EEUM.DLL
"CNP5E809_PrinterMakerA iR8500 PCL5e.DLL"  CNP5E809.DLL

[IR8500_DATA]
DriverFile="CNP5EE_PrinterMakerA iR8500 PCL5e.DLL"
ConfigFile="CNP5EEUI_PrinterMakerA iR8500 PCL5e.DLL"
UserModeDriver="CNP5EEUM_PrinterMakerA iR8500 PCL5e.DLL"
HelpFile=CNP5EE.HLP

[LB2000_FILES]
LB2000PK.XPD
"CNP5EE_PrinterMakerA LBP-2000 PCL5e.DLL"    CNP5EE.DLL
"CNP5EEUI_PrinterMakerA LBP-2000 PCL5e.DLL"  CNP5EEUI.DLL
"CNP5EEUM_PrinterMakerA LBP-2000 PCL5e.DLL"  CNP5EEUM.DLL

[LB2000_DATA]
DriverFile="CNP5EE_PrinterMakerA LBP-2000 PCL5e.DLL"
ConfigFile="CNP5EEUI_PrinterMakerA LBP2000 PCL5e.DLL"
UserModeDriver="CNP5EEUM_PrinterMakerA LBP 2000PCL5e.DLL"
HelpFile=CNP5EE.HLP

[DestinationDirs]
DefaultDestDir=66000
NT_PCOM_UK=66000
NS_CPCA=66002
DRVCOPY=66000

[SourceDisksFiles]
CNP5EE.DLL = 1
```

FROM FIG. 11A

[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CFINE32.DLL
CNXCPV32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020

CNP5EEUI.DLL = 1
CnP5eEUM.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCPV32.DLL = 1
CPCEDIT.DLL = 1
CPCQM809.CNT = 1
CPCQM809.HLP = 1
CPCVIEW.EXE = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1

[SourceDisksNames]
1=%DISK1%,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"

FIG. 12

| MODEL NAME | DRIVER FILE NAME | DRIVER FILE NAME AFTER RENAMING |
|---|---|---|
| PrinterMakerA iR1600-2000 PCL5e | CNP5EE.DLL | CNP5EE_1B3ADB36-3C65-4f8d-AFC9-AFB020463D5D.DLL |
| PrinterMakerA iR2200-3300 PCL5e | CNP5EE.DLL | CNP5EE_12D5D087-1CBF-4497-BB2B-8BFD3A20A5CD.DLL |
| PrinterMakerA iR400 PCL5e | CNP5EE.DLL | CNP5EE_79FBEA32-7C10-405d-AF2D-18C577D31777.DLL |
| PrinterMakerA iR5000-6000 PCL5e | CNP5EE.DLL | CNP5EE_8262187F-6CDC-48c2-AE3B-E96FB4DE756A.DLL |
| PrinterMakerA iR5000-6000-L1 PCL5e | CNP5EE.DLL | CNP5EE_590C71FD-D88A-4e90-B72A-C40CBB73D28D.DLL |
| PrinterMakerA iR7200 PCL5e | CNP5EE.DLL | CNP5EE_D06A99AC-4BB7-44ed-AEC3-BEF2DBCB5BBC.DLL |
| PrinterMakerA iR7200-M1 PCL5e | CNP5EE.DLL | CNP5EE_BA7C588C-5EC1-45ce-A026-BFDB228CCE54.DLL |
| PrinterMakerA iR7200-M2 PCL5e | CNP5EE.DLL | CNP5EE_60C59E56-2B8A-42be-A26F-8927EB160160.DLL |
| PrinterMakerA iR8500 PCL5e | CNP5EE.DLL | CNP5EE_D2C6111C-9A61-4817-B6C9-4100178F6C81.DLL |
| PrinterMakerA iR8500-M1 PCL5e | CNP5EE.DLL | CNP5EE_DAAB698E-0C3E-493b-A70C-DDE165E0201C.DLL |
| PrinterMakerA iR8500-M2 PCL5e | CNP5EE.DLL | CNP5EE_5FAC6F84-7976-4102-A3CC-C81111A4B265.DLL |
| PrinterMakerA iR105 PCL5e | CNP5EE.DLL | CNP5EE_70766ED2-483B-4c12-88D8-F8C1A5F1C938.DLL |
| PrinterMakerA iR105-M1 PCL5e | CNP5EE.DLL | CNP5EE_E87CE9B1-0915-490e-8460-82B93EE7B928.DLL |
| PrinterMakerA iR105-M2 PCL5e | CNP5EE.DLL | CNP5EE_3251B6FF-AF73-4cbc-82A6-F77DD38FF13C.DLL |
| PrinterMakerA GP160 PCL5e | CNP5EE.DLL | CNP5EE_328BB481-BA2A-4303-AF77-7DA6E6BE6EDC.DLL |
| PrinterMakerA GP200-215 PCL-P3/B1 | CNP5EE.DLL | CNP5EE_118F4D84-8B3D-4f9b-A4E7-4007380EF95A.DLL |
| PrinterMakerA GP200-225 PCL | CNP5EE.DLL | CNP5EE_2AAD302B-30DA-44c0-98DE-64F945C2DAC3.DLL |
| PrinterMakerA GP300-405 PCL | CNP5EE.DLL | CNP5EE_A5DD6741-F40B-48ea-83B8-60ED984CB1EF.DLL |
| PrinterMakerA CP555-605-605P PCL | CNP5EE.DLL | CNP5EE_3F440D51-EE9D-42db-80DF-1A785B6B9C21.DLL |
| PrinterMakerA LBP-1000 PCL5e | CNP5EE.DLL | CNP5EE_25C6FF24-9687-4829-A60A-82FE7F2243F4.DLL |
| PrinterMakerA LBP-1760/1760e PCL5e | CNP5EE.DLL | CNP5EE_AF434665-7E28-4603-9EF9-62DD9350693A.DLL |
| PrinterMakerA LBP-2000 PCL5e | CNP5EE.DLL | CNP5EE_4557CE48-38B9-452b-8067-8B9AB9ABD4FB.DLL |
| PrinterMakerA LBP-3260 PCL5e | CNP5EE.DLL | CNP5EE_A5478E0F-BB67-46b9-942F-FB2415B53628.DLL |

FIG. 13

| MODEL NAME | DRIVER FILE NAME | DRIVER FILE NAME AFTER RENAMING |
|---|---|---|
| PrinterMakerA iR1600-2000 PCL5e | CNP5EE.DLL | CNP5EE_PrinterMakerA iR1600-2000 PCL5e_530.DLL |
| PrinterMakerA iR2200-3300 PCL5e | CNP5EE.DLL | CNP5EE_PrinterMakerA iR2200-3300 PCL5e_530.DLL |
| PrinterMakerA iR400 PCL5e | CNP5EE.DLL | CNP5EE_PrinterMakerA iR400 PCL5e_530.DLL |
| PrinterMakerA iR5000-6000 PCL5e | CNP5EE.DLL | CNP5EE_PrinterMakerA iR5000-6000 PCL5e_530.DLL |
| PrinterMakerA iR5000-6000-L1 PCL5e | CNP5EE.DLL | CNP5EE_PrinterMakerA iR5000-6000-L1 PCL5e_530.DLL |
| PrinterMakerA iR7200 PCL5e | CNP5EE.DLL | CNP5EE_PrinterMakerA iR7200 PCL5e_530.DLL |
| PrinterMakerA iR7200-M1 PCL5e | CNP5EE.DLL | CNP5EE_PrinterMakerA iR7200-M1 PCL5e_530.DLL |
| PrinterMakerA iR7200-M2 PCL5e | CNP5EE.DLL | CNP5EE_PrinterMakerA iR7200-M2 PCL5e_530.DLL |
| PrinterMakerA iR8500 PCL5e | CNP5EE.DLL | CNP5EE_PrinterMakerA iR8500 PCL5e_530.DLL |
| PrinterMakerA iR8500-M1 PCL5e | CNP5EE.DLL | CNP5EE_PrinterMakerA iR8500-M1 PCL5e_530.DLL |
| PrinterMakerA iR8500-M2 PCL5e | CNP5EE.DLL | CNP5EE_PrinterMakerA iR8500-M2 PCL5e_530.DLL |
| PrinterMakerA iR105 PCL5e | CNP5EE.DLL | CNP5EE_PrinterMakerA iR105 PCL5e_530.DLL |
| PrinterMakerA iR105-M1 PCL5e | CNP5EE.DLL | CNP5EE_PrinterMakerA iR105-M1 PCL5e_530.DLL |
| PrinterMakerA iR105-M2 PCL5e | CNP5EE.DLL | CNP5EE_PrinterMakerA iR105-M2 PCL5e_530.DLL |
| PrinterMakerA GP160 PCL5e | CNP5EE.DLL | CNP5EE_PrinterMakerA GP160 PCL5e_530.DLL |
| PrinterMakerA GP200-215 PCL-P3/B1 | CNP5EE.DLL | CNP5EE_PrinterMakerA GP200-215 PCL-P3-B1_530.DLL |
| PrinterMakerA GP200-225 PCL | CNP5EE.DLL | CNP5EE_PrinterMakerA GP200-225 PCL_530.DLL |
| PrinterMakerA GP300-405 PCL | CNP5EE.DLL | CNP5EE_PrinterMakerA GP300-405 PCL_530.DLL |
| PrinterMakerA GP555-605-605P PCL | CNP5EE.DLL | CNP5EE_PrinterMakerA GP555-605-605P PCL_530.DLL |
| PrinterMakerA LBP-1000 PCL5e | CNP5EE.DLL | CNP5EE_PrinterMakerA LBP-1000 PCL5e_530.DLL |
| PrinterMakerA LBP-1760/1760e PCL5e | CNP5EE.DLL | CNP5EE_PrinterMakerA LBP-1760-1760e PCL5e_530.DLL |
| PrinterMakerA LBP-2000 PCL5e | CNP5EE.DLL | CNP5EE_PrinterMakerA LBP-2000 PCL5e_530.DLL |
| PrinterMakerA LBP-3260 PCL5e | CNP5EE.DLL | CNP5EE_PrinterMakerA LBP-3260 PCL5e_530.DLL |

FIG. 14

| FIG. 14A |
|----------|
| FIG. 14B |

FIG. 14A

```
; PrinterMakerA PCL5e Printer INF for Windows 2000/XP
; Copyright PrinterMakerA INC.2002 All Rights Reserved
; (CD-ROM Release)
; W2KPCL5E.INF
; Version 5.30

[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR8500059D
"PrinterMakerA LBP-2000 PCL5e"
= LB2000_UK,LPTENUM#PrinterMakerALBP-2000113E,
USBPRINT#PrinterMakerALBP-2000113E,PrinterMakerALBP-2000113E

[IR8500_]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

; Identfication #  PCL5e UK
; IR8500     : E287
; LBP-2000 : 441B

[IR8500_FILES]
IR8500PK.XPD
"CNP5EE_PrinterMakerA iR8500 PCL5e_530.DLL"       CNP5EE.DLL
"CNP5EEUI_PrinterMakerA iR8500 PCL5e_530.DLL"  CNP5EEUI.DLL
"CNP5E809_PrinterMakerA iR8500 PCL5e_530.DLL"  CNP5E809.DLL

[IR8500_DATA]
DriverFile="CNP5EE_PrinterMakerA iR8500 PCL5e_530.DLL"
ConfigFile="CNP5EEUI_PrinterMakerA iR8500 PCL5e_530.DLL"
HelpFile=CNP5EE.HLP

[LB2000_FILES]
LB2000PK.XPD
"CNP5EE_PrinterMakerA LBP-2000 PCL5e_530.DLL"   CNP5EE.DLL
"CNP5EEUI_PrinterMakerA LBP-2000 PCL5e_530.DLL"  CNP5EEUI.DLL

[LB2000_DATA]
DriverFile="CNP5EE_PrinterMakerA LBP-2000 PCL5e_530.DLL"
ConfigFile="CNP5EEUI_PrinterMakerA LBP-2000 PCL5e_530.DLL"
HelpFile=CNP5EE.HLP

[DestinationDirs]
DefaultDestDir=66000
NT_PCOM_UK=66002
NS_CPCA=66002
DRVCOPY=66000
```

FROM FIG. 14A

```
[NT.P5]
CNXPRASX.DLL
AUSSDRV.DLL

[NT.P5.DC1]
CNPPDCE.DLL
CNNBAPIE.DLL
CNNSCORE.DLL

[NT.P5.DC1A]
CNPPDCE.DLL

[HELP_UK]
CNP5EE.HLP
CNP5EE.CNT

[NT.PCOM.UK]
CPCSPL.DLL
CPCDSPL.EXE
CPCQM.EXE
CPCR809.DLL
CFINE32.DLL
CNXCPV32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS.CPCA]
AUCPLMNT.DLL,,,0x00000020
```

```
[SourceDisksFiles]
CNP5EE.DLL = 1
CNP5EEUI.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCPV32.DLL = 1
CPCEDIT.DLL = 1
CPCQM809.CNT = 1
CPCQM809.HLP = 1
CPCVIEW.EXE = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1
AUSSDRV.DLL = 1
AUSSAPI.DAT = 1
NBAPI.DLL = 1
NBIPC.DLL = 1
AUCPLMNT.DLL = 1

[SourceDisksNames]
1=%DISK1%,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"
```

| FIG. 15A |
| FIG. 15B |

FIG. 15A

```
[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM¥PrinterMakerAIR8500059D
"PrinterMakerA LBP-2000 PCL5e"
= LB2000_UK,LPTENUM¥PrinterMakerALBP-2000113E,
USBPRINT¥PrinterMakerALBP-2000113E,PrinterMakerALBP-2000113E

[IR8500_]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"

[NT_P5]
CNXPRASX.DLL
AUSSDRV.DLL
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

[IR8500_FILES]
IR8500PK.XPD
"CNP5EE_PrinterMakerA iR8500 PCL5e_530.DLL"      CNP5EE.DLL
"CNP5EEUI_PrinterMakerA iR8500 PCL5e_530.DLL"    CNP5EEUI.DLL
"CNP5EEUM_PrinterMakerA iR8500 PCL5e_530.DLL"    CNP5EEUM.DLL
"CNP5E809_PrinterMakerA iR8500 PCL5e_530.DLL"    CNP5E809.DLL

[IR8500_DATA]
DriverFile="CNP5EE_PrinterMakerA iR8500 PCL5e_530.DLL"
ConfigFile="CNP5EEUI_PrinterMakerA iR8500 PCL5e_530.DLL"
UserModeDriver="CNP5EEUM_PrinterMakerA iR8500 PCL5e_530.DLL"
HelpFile=CNP5EE.HLP

[LB2000_FILES]
LB2000PK.XPD
"CNP5EE_PrinterMakerA LBP-2000 PCL5e_530.DLL"      CNP5EE.DLL
"CNP5EEUI_PrinterMakerA LBP-2000 PCL5e_530.DLL"    CNP5EEUI.DLL
"CNP5EEUM_PrinterMakerA LBP-2000 PCL5e_530.DLL"    CNP5EEUM.DLL

[LB2000_DATA]
DriverFile="CNP5EE_PrinterMakerA LBP-2000 PCL5e_530.DLL"
ConfigFile="CNP5EEUI_PrinterMakerA LBP2000 PCL5e_530.DLL"
UserModeDriver="CNP5EEUM_PrinterMakerA LBP 2000PCL5e_530.DLL"
HelpFile=CNP5EE.HLP

[DestinationDirs]
DefaultDestDir=66000
NT_PCOM_UK=66000
NS_CPCA=66002
DRVCOPY=66000

[SourceDisksFiles]
CNP5EE.DLL = 1
```

TO FIG. 15B

FROM FIG. 15A

```
[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CFINE32.DLL
CNXCPV32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020

CNP5EUI.DLL = 1
CnP5eBUM.DLL = 1
CNP5E809.DLL = 1
CNXPRASX.DLL = 1
CnPXCM32.DLL = 1
CMDFPXK.DAT = 1
UCS32P.DLL  = 1
CNPPDCE.DLL = 1
CNNBAPIE.DLL = 1
CNNSCORE.DLL = 1
CPCSPL.DLL  = 1
CPCDSPL.EXE = 1
CPCQM.EXE   = 1
CPCR809.DLL = 1
CNXCPV32.DLL = 1
CPCEDIT.DLL = 1
CPCQM809.CNT = 1
CPCQM809.HLP = 1
CPCVIEW.EXE = 1
TNL32.DLL   = 1
CFINE32.DLL = 1
CNP5EE.HLP  = 1
CNP5EE.CNT  = 1
IE8500PK.XPD = 1
LB2000PK.XPD = 1
CNLK.PRF    = 1

[SourceDisksNames]
1=%DISK1%,,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"
```

| MODEL NAME | DRIVER FILE NAME | DRIVER FILE NAME AFTER RENAMING |
|---|---|---|
| PrinterMakerA iR1600-2000 PCL5e | CNP5EE.DLL | CNP5EE_0.DLL |
| PrinterMakerA iR2200-3300 PCL5e | CNP5EE.DLL | CNP5EE_1.DLL |
| PrinterMakerA iR400 PCL5e | CNP5EE.DLL | CNP5EE_2.DLL |
| PrinterMakerA iR5000-6000 PCL5e | CNP5EE.DLL | CNP5EE_3.DLL |
| PrinterMakerA iR5000-6000-L1 PCL5e | CNP5EE.DLL | CNP5EE_4.DLL |
| PrinterMakerA iR7200 PCL5e | CNP5EE.DLL | CNP5EE_5.DLL |
| PrinterMakerA iR7200-M1 PCL5e | CNP5EE.DLL | CNP5EE_6.DLL |
| PrinterMakerA iR7200-M2 PCL5e | CNP5EE.DLL | CNP5EE_7.DLL |
| PrinterMakerA iR8500 PCL5e | CNP5EE.DLL | CNP5EE_8.DLL |
| PrinterMakerA iR8500-M1 PCL5e | CNP5EE.DLL | CNP5EE_9.DLL |
| PrinterMakerA iR8500-M2 PCL5e | CNP5EE.DLL | CNP5EE_A.DLL |
| PrinterMakerA iR105 PCL5e | CNP5EE.DLL | CNP5EE_B.DLL |
| PrinterMakerA iR105-M1 PCL5e | CNP5EE.DLL | CNP5EE_C.DLL |
| PrinterMakerA iR105-M2 PCL5e | CNP5EE.DLL | CNP5EE_D.DLL |
| PrinterMakerA GP160 PCL5e | CNP5EE.DLL | CNP5EE_E.DLL |
| PrinterMakerA GP200-215 PCL-P3/B1 | CNP5EE.DLL | CNP5EE_F.DLL |
| PrinterMakerA GP200-225 PCL | CNP5EE.DLL | CNP5EE_10.DLL |
| PrinterMakerA GP300-405 PCL | CNP5EE.DLL | CNP5EE_11.DLL |
| PrinterMakerA GP555-605-605P PCL | CNP5EE.DLL | CNP5EE_12.DLL |
| PrinterMakerA LBP-1000 PCL5e | CNP5EE.DLL | CNP5EE_13.DLL |
| PrinterMakerA LBP-1760/1760e PCL5e | CNP5EE.DLL | CNP5EE_14.DLL |
| PrinterMakerA LBP-2000 PCL5e | CNP5EE.DLL | CNP5EE_15.DLL |
| PrinterMakerA LBP-3260 PCL5e | CNP5EE.DLL | CNP5EE_16.DLL |

FIG. 17

| FIG. 17A |
| FIG. 17B |

FIG. 17A

```
; PrinterMakerA PCL5e Printer INF for Windows 2000/XP
; Copyright PrinterMakerA INC.2002 All Rights Reserved
; (CD-ROM Release)
; W2KPCL5E.INF
; Version 5.30

[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR85000059D
"PrinterMakerA LBP-2000 PCL5e"
= LB2000_UK,LPTENUM#PrinterMakerALBP-2000113E,
USBPRINT¥PrinterMakerALBP-2000113E,PrinterMakerALBP-2000113E

[IR8500_UK]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_UK]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

; Identification #  PCL5e UK
; iR8500    : E287
; LBP-2000 : 441B

[IR8500]
IR8500PK.XPD
CNP5EE.8.DLL       CNP5EE.DLL
CNP5EEUI.8.DLL     CNP5EEUI.DLL
CNP5E809.8.DLL     CNP5E809.DLL

[IR8500_DATA]
DriverFile="CNP5EE.8.DLL
ConfigFile="CNP5EEUI.8.DLL
HelpFile=CNP5EE.HLP

[LB2000]
LB2000PK.XPD
CNP5EE.15.DLL      CNP5EE.DLL
CNP5EEUI.15.DLL    CNP5EEUI.DLL

[LB2000_DATA]
DriverFile=CNP5EE.15.DLL
ConfigFile=CNP5EEUI.15.DLL
HelpFile=CNP5EE.HLP

[DestinationDirs]
DefaultDestDir=66000
NT_PCOM_UK=66000
NS_CPCA=66002
DRVCOPY=66000

[SourceDisksFiles]
```

FROM FIG. 17A

```
[NT_P5]
CNXPRASX.DLL
AUSSDRV.DLL

[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CFINE32.DLL
CNXCPV32.DLL
CPCEDIT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020
```

```
CNP5EE.DLL = 1
CNP5EEUI.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCPV32.DLL = 1
CPCEDIT.DLL = 1
CPCQM809.CNT = 1
CPCQM809.HLP = 1
CPCVIEW.EXE = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1
AUSSDRV.DLL = 1
AUSSAPI.DAT = 1
NBAPI.DLL = 1
NBIPC.DLL = 1
AUCPLMNT.DLL = 1

[SourceDisksNames]
1=%DISK1%,,,""

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"
```

| FIG. 18A |
|----------|
| FIG. 18B |

FIG. 18A

```
[Version]
Signature="$Windows NT$"
Provider=%PrinterMakerA%
ClassGUID={4D36E979-E325-11CE-BFC1-08002BE10318}
Class=Printer
DriverVer=0x/xx/2002,5.40.0.0
CatalogFile = Cnp5ee.cat

[Manufacturer]
%PrinterMakerA%=PrinterMakerA

[PrinterMakerA]
"PrinterMakerA iR8500 PCL5e"
= IR8500_UK,LPTENUM#PrinterMakerAIR8500059D
"PrinterMakerA LBP-2000 PCL5e"
= LB2000_UK,LPTENUM#PrinterMakerALBP-2000113E, USBPRINT#PrinterMakerALBP-2000113E,PrinterMakerALBP-2000113E

[IR8500_UK]
CopyFiles=IR8500PK,NT_P5,HELP_UK,NT_P5_DC1A,PROFILE,NT_PCOM_
UK,COLORGEAR,NS_CPCA,DRVCOPY,NS_COMMON,AUSS
DataFile=IR8500PK.XPD
DataSection=IR8500_DATA
LanguageMonitor=%NS_LMON_CPCA%

[LB2000_UK]
CopyFiles=LB2000PK,NT_P5,HELP_UK,NT_P5_DC1A,PROFILE,NT_PCOM_
UK,COLORGEAR,NS_CPCA,DRVCOPY,NS_COMMON,AUSS
DataFile=LB2000PK.XPD
DataSection=LB2000_DATA
LanguageMonitor=%NS_LMON_CPCA%

[OEM URLS]
%PrinterMakerA% =
"http://www.PrinterMakerA.com/support/index.html?model=%model%"

[NT_P5]
CNXPRASX.DLL
AUSSDRV.DLL
```

```
[DRVCOPY]
AUCPLMNT.DLL,,,0x00000020

[NS_COMMON]
NBAPI.DLL,,,0x00000020
NBIPC.DLL,,,0x00000020

[AUSS]
AUSSAPI.DAT

[IR8500]
IR8500PK.XPD
CNP5EE_8.DLL         CNP5EE.DLL
CNP5EEUI_8.DLL       CNP5EEUI.DLL
CNP5EEUM_8.DLL       CNP5EEUM.DLL
CNP5E809_8.DLL       CNP5E809.DLL

[IR8500_DATA]
DriverFile=CNP5EE_8.DLL
ConfigFile=CNP5EEUI_8.DLL
UserModeDriver=CNP5EEUM_8.DLL
HelpFile=CNP5EE.HLP

[LB2000]
LB2000PK.XPD
CNP5EE_15.DLL        CNP5EE.DLL
CNP5EEUI_15.DLL      CNP5EEUI.DLL
CNP5EEUM_15.DLL      CNP5EEUM.DLL

[LB2000_DATA]
DriverFile=CNP5EE_15.DLL
ConfigFile=CNP5EEUI_15.DLL
UserModeDriver=CNP5EEUM_15.DLL
HelpFile=CNP5EE.HLP

[DestinationDirs]
DefaultDestDir=66000
NT_PCOM_UK=66000
NS_CPCA=66002
DRVCOPY=66000

[SourceDisksFiles]
CNP5EE.DLL = 1
```

FROM FIG. 18A

```
[NT_P5_DC1]
CNPPDCE.DLL
CNNBAPIE.DLL
CNNSCORE.DLL

[NT_P5_DC1A]
CNPPDCE.DLL

[HELP_UK]
CNP5EE.HLP
CNP5EE.CNT

[NT_PCOM_UK]
CPCSPL.DLL
CPCDSPL.EXE
CPCQM.EXE
CPCR809.DLL
CFINE32.DLL
CNXCPV32.DLL
CPCEDT.DLL
CPCQM809.CNT
CPCQM809.HLP
CPCVIEW.EXE

[COLORGEAR]
CnPXCM32.DLL
CMDFPXK.DAT
UCS32P.DLL
TNL32.DLL

[PROFILE]
CNLK.PRF

[NS_CPCA]
AUCPLMNT.DLL,,,0x00000020
```

```
CNP5EEUI.DLL = 1
CnP5eEUM.DLL = 1
CNP5E809.DLL = 1
CNXPRASX.DLL = 1
CnPXCM32.DLL = 1
CMDFPXK.DAT = 1
UCS32P.DLL = 1
CNPPDCE.DLL = 1
CNNBAPIE.DLL = 1
CNNSCORE.DLL = 1
CPCSPL.DLL = 1
CPCDSPL.EXE = 1
CPCQM.EXE = 1
CPCR809.DLL = 1
CNXCPV32.DLL = 1
CPCEDT.DLL = 1
CPCQM809.CNT = 1
CPCQM809.HLP = 1
CPCVIEW.EXE = 1
TNL32.DLL = 1
CFINE32.DLL = 1
CNP5EE.HLP = 1
CNP5EE.CNT = 1
IE8500PK.XPD = 1
LB2000PK.XPD = 1
CNLK.PRF = 1

[SourceDisksNames]
1=%DISK1%,,,

[Strings]
PrinterMakerA="PrinterMakerA"
NS_LMON_CPCA="CPCA Language Monitor2,AUCPLMNT.DLL"
DISK1="PrinterMakerA PCL5e Printer Driver for Microsoft Windows 2000 Disk #1"
```

INFORMATION PROCESSING APPARATUS, INFORMATION PROCESSING METHOD, AND COMPUTER-READABLE MEMORY MEDIUM STORING PROGRAM FOR REALIZING THE METHOD

This application is a divisional application of co-pending application Ser. No. 10/626,588, filed Jul. 25, 2003, which is incorporated herein by reference.

BACKGROUND OF THE INVENTION

1. Field of the Invention

The invention relates to peripheral devices, an information processing apparatus in which a control program for controlling the peripheral devices has been installed, and a method and a control program for controlling those devices and apparatus.

2. Related Background Art

A program group called an installation set is necessary for installing a device driver (hereinafter, referred to as a driver) as a control program for controlling peripheral devices. The driver as an installation target, an installer as a control program for installing the driver, and the like are included in the installation set. The drivers ordinarily differ in dependence on a type or a version. As an installation set, there are two types of formats: a format in which a plurality of corresponding model types are incorporated in one installation set; and a format in which the installation set is formed every corresponding model type. Specifically speaking, in the case of the former format, when installation start is instructed to an installing program called an installer, a plurality of model types are listed as installation targets and one of them can be selected. In the case of the latter format, only one model type is selected as an installation target upon installation and the driver can be installed in response to an instruction of the user. However, if the drivers of a plurality of corresponding model types are incorporated into one installation set in the former format, the following inconvenience is caused. For example, if a driver named BBB which corresponds to a version 2.00 is installed into a personal computer in which a driver named AAA whose version is 1.00 has been installed, a problem such that the version of the driver corresponding to AAA is also automatically upgraded to v2.00 occurs. The problem as mentioned above occurs particularly in the case where AAA and BBB include the same driver module group.

Although the above method is very advantageous to the user who always wants to upgrade the version of a printer driver installed in the computer to the latest, it means the version of the printer driver is arbitrarily upgraded without the user's recognition or consent.

However, the foregoing method is disadvantageous to the recent users who spend a long time to test the operation of the printer drivers to confirm it upon installation of a system and use only the drivers whose operation has been confirmed in a user environment. For example, in a large office which uses a print application or the like which depends largely on the printer driver in combination with the printer driver, severely strict management of the versions of the drivers is required and there is a strong demand to upgrade the version of only the driver designated by the user. There is also a strong demand to selectively and properly upgrade the version of the driver as a target of the version-up. This is true of management of the device drivers of the peripheral devices other than a printer.

For example, if the module sets constructing the printer drivers are the same in the above case, there is a case where the module of AAA is overwritten accompanied with the new installation of the new printer driver BBB. There is also a disadvantage such that the system has to be re-activated after the installation due to the overwriting process.

SUMMARY OF THE INVENTION

There is a strong demand to avoid the re-activation of the system in a computer of a server system in the large office as much as possible. The user who wants to avoid the re-activation accompanied with the unnecessary upgrade of the modules which is caused by the new installation of a certain module as mentioned above.

If the installation set is formed every corresponding model type, since the module sets constructing the printer drivers differ every model type, the system re-activation after the installation of the new printer driver and the version-up which is not desired by the user as mentioned above can be prevented. There is, however, a disadvantage such that since it is necessary to form the printer driver every model type, the number of developing steps is very large. Particularly, when the apparatuses cope with a new OS (Operating System), or the like, it is necessary to form the printer drivers of all model types, and when it is intended that contents of a fault corrected in a certain model type are reflected to another model type, it is necessary to separately form the printer driver of such another model type. If there are apparatuses of many model types whose version-up is desired, it is necessary to prepare the installation sets of the apparatuses of the model types which need the version-up and separately execute them, so that the installing operation is complicated.

The invention intends to solve such a situation and it is an object of the invention to provide a mechanism such that when a device driver is installed, names of module sets to be installed are changed in accordance with a predetermined rule, thereby properly installing the driver.

Another object of the invention is to provide a mechanism such that a driver as a target of version-up can be properly selected and the version of the selected driver can be properly upgraded.

Further another object of the invention is to provide a mechanism such that even in the case of newly installing a certain driver, another driver is not overwritten due to such installation, thereby reducing the number of times of re-activation.

According to the first aspect of the invention, there is provided an information processing apparatus which can install a first control program corresponding to a first peripheral device and a second control program for controlling a second peripheral device, the first and second control programs including a common module. The apparatus comprises deciding means for deciding so that identification information of the common module which operates as a part of the first control program and identification information of the common module which operates as a part of the second control program are made different.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 1 is a block diagram for explaining a construction of a print control apparatus showing an embodiment of the invention;

FIG. 4 shows a schematic diagram of a printer driver installing method for explaining a whole construction of the embodiment;

FIG. 5 shows a correlation diagram between friendly names of printer drivers and hexadecimal numbers which are formed by CRC.exe;

FIG. 6, which includes FIGS. 6A and 6B, shows an example of an INF file for a certain OS which is used in the embodiment;

FIG. 7, which includes FIGS. 7A and 7B, shows an example of an INF file for another OS which is used in the embodiment and different from FIG. 6;

FIG. 8 shows necessity of system re-activation after installation;

FIG. 9 is a diagram showing an example of rename of a common module;

FIG. 10, which includes FIGS. 10A and 10B, is a diagram showing a description example of an INF file which can be used in a certain OS;

FIG. 11, which includes FIGS. 11A and 11B, is a diagram showing a description example of an INF file which can be applied to another OS different from FIG. 10;

FIG. 12 is a diagram showing an example of rename of a common module;

FIG. 13 is a diagram showing an example of rename of a common module;

FIG. 14, which includes FIGS. 14A and 14B, is a diagram showing a description example of an INF file which can be used in a certain OS;

FIG. 15, which includes FIGS. 15A and 15B, is a diagram showing an example of an INF file which can be applied to another OS different from FIG. 14;

FIG. 16 is a diagram showing an example of rename of a common module;

FIG. 17, which includes FIGS. 17A and 17B, is a diagram showing a description example of an INF file which can be used in a certain OS;

FIG. 18, which includes FIGS. 18A and 18B, is a diagram showing an example of an INF file which can be applied to another OS different from FIG. 14.

DETAILED DESCRIPTION OF THE PREFERRED EMBODIMENTS

Figure 2:
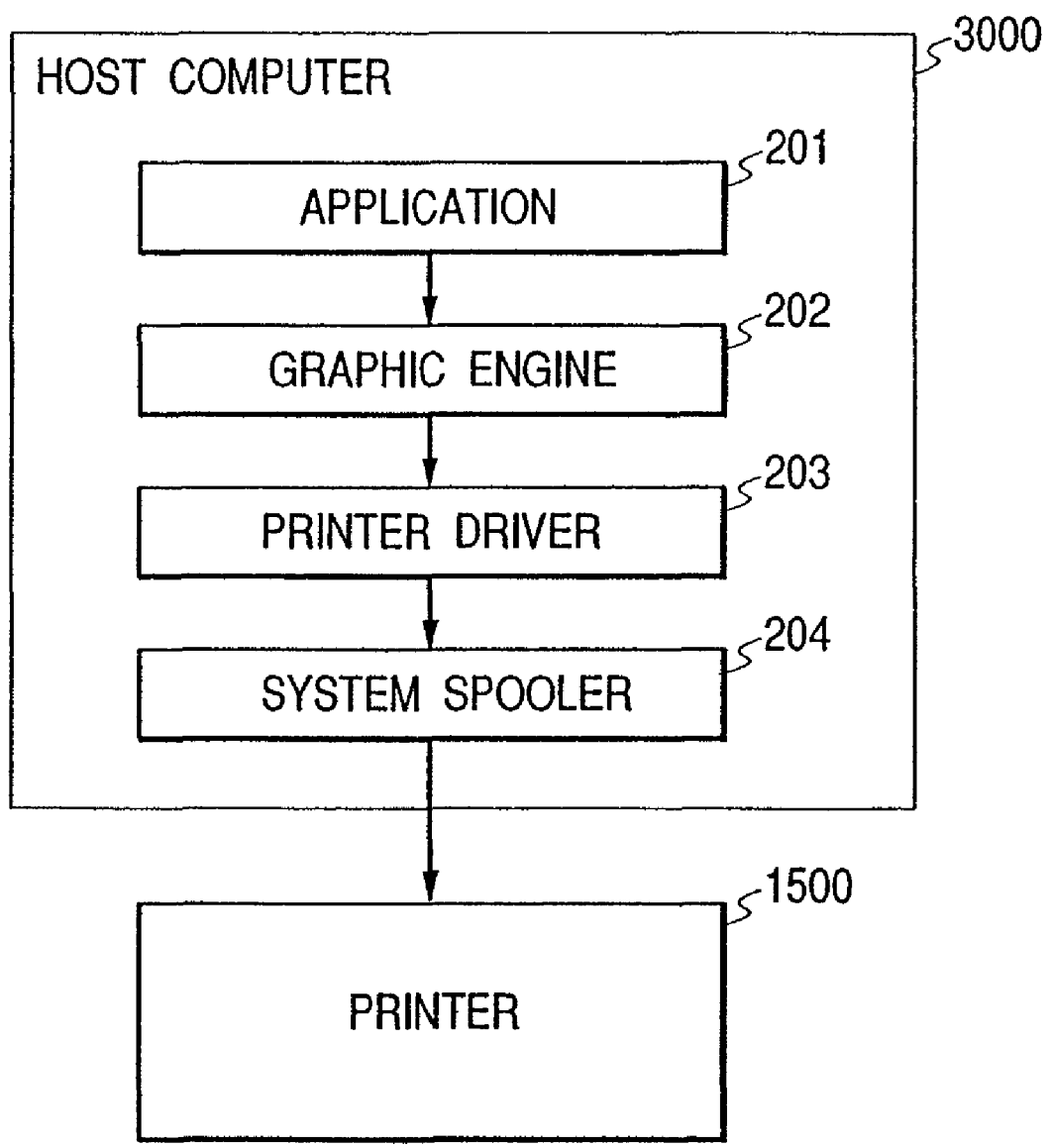
FIG. 2 is a block diagram for explaining a typical print data forming method in a host computer.

Embodiments of the invention will be described hereinbelow with reference to the drawings. The following embodiments are examples for explaining various aspects of the invention and, naturally, the invention is not limited to the following embodiments within the purview without departing from the spirit of the invention.

First Embodiment

FIG. 1 is a diagram showing a construction of a printer control system showing an example of the embodiment of the invention. Naturally, the invention can be applied to any of a single apparatus, a system comprising a plurality of apparatuses, and a system which is connected via a network such as LAN, WAN, or the like and in which processes are executed so long as the functions of the invention are executed. In the diagram, a host computer 3000 has a CPU 1 for executing processes of a document in which a figure, an image, characters, a table (including a spreadsheet, etc.), and the like exist mixedly on the basis of a document processing program or the like stored in a program ROM of a ROM 3 or an external memory 11. The CPU 1 integratedly controls each device connected to a system bus 4. An operating system program (hereinafter, abbreviated to OS) or the like as a control program of the CPU 1 is stored in the program ROM of the ROM 3 or the external memory 11. Font data or the like which is used in the document processes is stored in a font ROM of the ROM 3 or the external memory 11. Various data which is used when the document processes or the like are executed is stored in a data ROM of the ROM 3 or the external memory 11. A RAM 2 functions as a main memory, a work area, or the like of the CPU 1. An installer as a control program to install the printer drivers is also stored in the HDD 11. The OS is controlled in a manner such that the installer is loaded into the RAM 2, the driver is read out from the HDD 11 and obtained or the driver is obtained via a network (not shown), and the printer driver obtained by the installer is stored into a predetermined storing area via an API of the OS. Further, the installer is registered into an area called a registry via the API of the OS so that the OS can recognize the driver which has newly been installed.

A keyboard controller (KBC) 5 controls a key input from a keyboard 9 or a pointing device (not shown). A CRT controller (CRTC) 6 controls a display of a CRT display (CRT) 10. A disk controller (DKC) 7 controls an access to the external memory 11 such as a hard disk (HD), a floppy (registered trademark) disk (FD), or the like for storing a boot program, various applications, font data, a user file, an edit file, a printer control command generating program (hereinafter, referred to as a printer driver), and the like. A printer controller (PRTC) 8 is connected to a printer 1500 via a bidirectional interface (interface) 21 and executes a communication control process with the printer 1500. Although the printer driver has been mentioned as a control program for controlling the peripheral devices in the embodiment, a control program for controlling a digital camera, a copying apparatus, a facsimile, an ink jet printer, a laser beam printer, or their hybrid apparatus can be also used.

The CPU 1 executes, for example, a developing (rasterizing) process of an outline font into a display information RAM set on the RAM 2, thereby enabling WYSIWYG on the CRT 10 to be realized. The CPU 1 opens various registered windows on the basis of commands instructed by a mouse cursor (not shown) or the like on the CRT 10 and executes various data processes. When the user executes the print, the CPU 1 opens the window regarding the print setting, thereby enabling the user to set a printer or set a print processing method for the printer driver including selection of a printing mode. The printer 1500 is controlled by a CPU 12. The printer CPU 12 outputs an image signal as output information to a printing unit (printer engine) 17 connected to a system bus 15 on the basis of a control program or the like stored in a program ROM of a ROM 13 or a control program or the like stored in an external memory 14. A control program or the like of the CPU 12 is stored in the program ROM of the ROM 13. Font data or the like which is used when the output information is formed is stored in a font ROM of the ROM 13. In the case of a printer without the external memory 14 such as a hard disk or the like, information or the like which is used on a host computer is stored in a data ROM of the ROM 13. The CPU 12 can execute a communicating process with the host computer via an input unit 18 and notify the host computer 3000 of the information or the like in the printer. A RAM 19 is a RAM which functions as a main memory, a work area, or the like of the CPU 12 and is constructed so that a memory capacity can be expanded by an option RAM which is connected to an expansion port (not shown). The RAM 19 is used as an output information rasterizing area, an environment data storing area, an NVRAM, or the like. An access of the external memory 14 such as hard disk (HD), IC card, or the like mentioned above is controlled by a memory controller (MC) 20. The external memory 14 is connected as an option and used for storing font data, an emulation program, form data, and the like and spooling the rasterized print data. Switches for operation, an LED display, and the like are arranged on the operation panel 18. Each module shown in FIG. 19, which will be explained hereinlater, has been stored in the foregoing HD.

As for the external memory 14 mentioned above, the number of memories is not limited to one but the apparatus can be also constructed in a manner such that a plurality of external memories 14 are provided and a plurality of memories such as option card to which built-in fonts have been added, memory for spooling the rasterized print data, and an external memory in which a program for interpreting printer control languages of different language systems have been stored can be connected. Further, the apparatus can be also constructed in a manner such that it has an NVRAM (not shown) and printer mode set information from an operation panel 1501 is stored therein.

FIG. 2 is a constructional diagram of a typical printing process in the host computer to which printing apparatuses such as printers or the like are connected directly or via a network. An application 201, a graphic engine 202, a printer driver 203, and a system spooler 204 are program modules which exist as files stored in the external memory 11. When those program module is executed, it is loaded into the RAM 2 by the OS or a module which uses such a module and executed. The application 201 and the printer driver 203 can be added to the FD of the external memory 11 or a CD-ROM (not shown) or to the HD of the external memory 11 via the network (not shown). Although the application 201 held in the external memory 11 is loaded into the RAM 2 and executed, when the application 201 allows the printer 1500 to execute the print, the output (drawing) is executed by using the graphic engine 202 which has similarly been loaded into the RAM 2 and can be executed.

The graphic engine 202 similarly loads the printer driver 203 prepared every printing apparatus into the RAM 2 from the external memory 11 and sets an output of the application 201 into the printer driver 203. The graphic engine 202 converts a GDI (Graphic Device Interface) function received from the application 201 into a DDI (Device Drive Interface) function and outputs the DDI function to the printer driver 203. On the basis of the DDI function received from the graphic engine 202, the printer driver 203 converts it into a control command which can be recognized by the printer, for example, PDL (Page Description Language). The converted printer control command is supplied to the system spooler 204 loaded in the RAM 2 and outputted as print data to the printer 1500 via an interface 21 by the OS.

Figure 3:
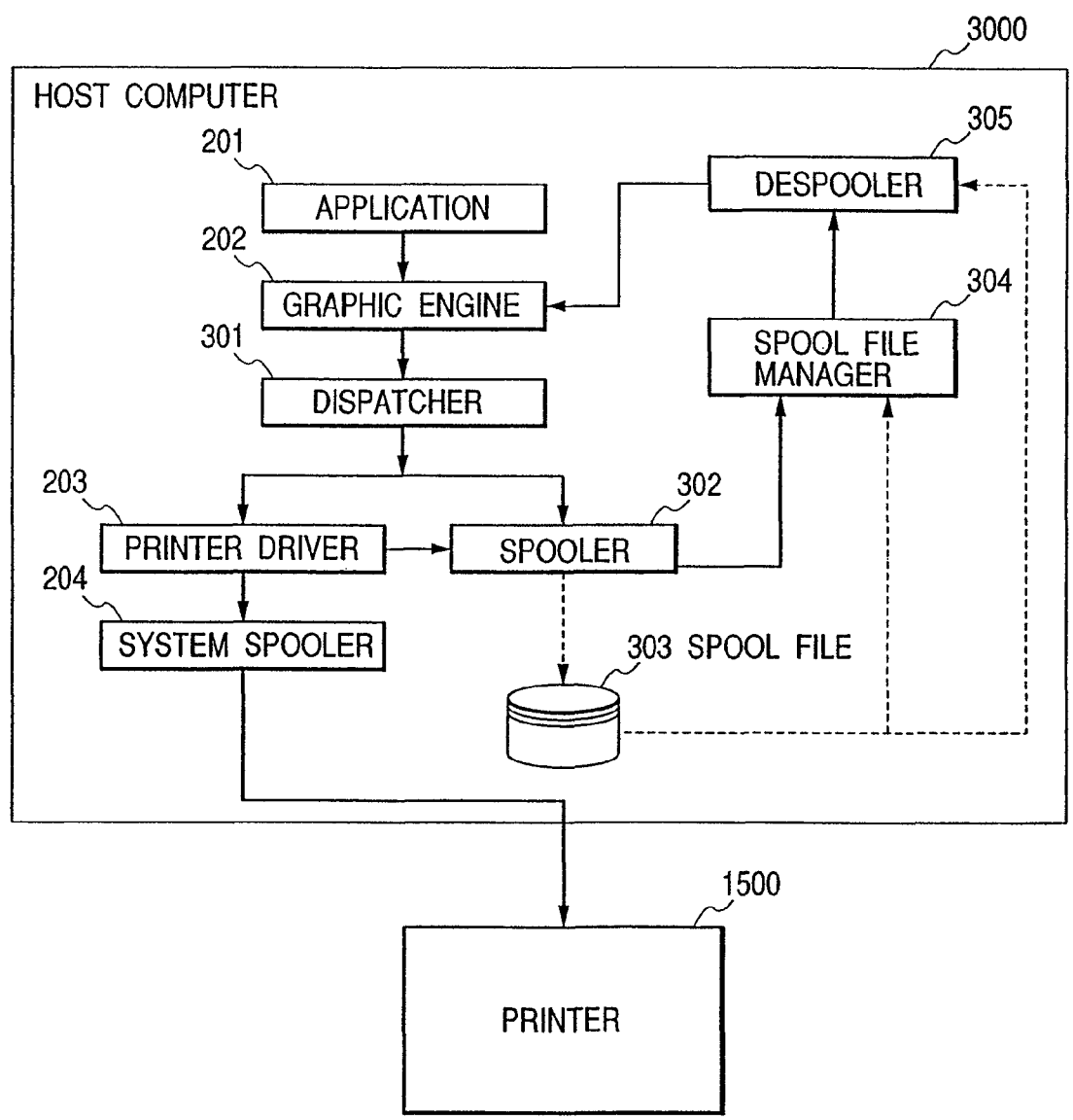
FIG. 3 is a block diagram for explaining a print data forming method which is used for forming an intermediate code and is a diagram obtained by expanding FIG. 2.

In addition to the print system comprising the printer and the host computer shown in FIG. 2, the print system of the embodiment further has a construction such that the print data supplied from the application is spooled once by intermediate code data as shown in FIG. 3.

FIG. 3 is a diagram obtained by expanding the system of FIG. 2 and has a construction such that when a print command is sent from the graphic engine 202 to the printer driver 203, a spool file 303 comprising intermediate codes is formed once. In the system of FIG. 2, the application 201 is released from the printing process at a point of time when the printer driver 203 has completely finished the conversion from all print commands from the graphic engine 202 into printer control commands. On the other hand, in the system of FIG. 3, it is released at a point of time when the spooler 302 converts all print commands into intermediate code data and outputs it to the spool file 303. Ordinarily, a time which is required in the latter method is shorter than that in the former method. In the system shown in FIG. 3, contents in the spool file 303 can be modified. Thus, it is possible to realize functions which the application does not have, that is, the functions such as enlargement/reduction, N-up print for reducing a plurality of pages and printing them into one page, and the like for the print data sent from the application.

To realize the above objects, the system of FIG. 2 is expanded so as to spool the print command by the intermediate code data as shown in FIG. 3. To modify the print data, ordinarily, the setting is performed from an window that is provided by the printer driver 203 and the printer driver 203 holds the set contents into the RAM 2 or the external memory 11.

Details of FIG. 3 will be described hereinbelow. As shown in FIG. 3, according to the expanded processing system, a dispatcher 301 receives the print commands from the graphic engine 202. If the print command received by the dispatcher 301 from the graphic engine 202 is a print command issued from the application 201 to the graphic engine 202, the dispatcher 301 loads a spooler 302 stored in the external memory 11 into the RAM 2 and sends the print command to the spooler 302 instead of the printer driver 203.

The spooler 302 converts the received print command into an intermediate code and outputs it to the spool file 303. The spooler 302 obtains the modification settings regarding the print data set for the printer driver 203 from the printer driver 203 and holds them into the spool file 303. Although the spool file 303 is formed as a file into the external memory 11, it can be also formed in the RAM 2. The spooler 302 further loads a spool file manager 304 stored in the external memory 11 into the RAM 2 and notifies the spool file manager 304 of a forming situation of the spool file 303. After that, the spool file manager 304 discriminates whether the print can be performed or not in accordance with contents of the modification settings regarding the print data stored in the spool file 303.

If the spool file manager 304 determines that the print can be performed by using the graphic engine 202, it loads a despooler 305 stored in the external memory 11 into the RAM 2 and instructs the despooler 305 to execute the printing process of the intermediate code described in the spool file 303.

The despooler 305 modifies the intermediate code included in the spool file 303 in accordance with the contents of the modification settings included in the spool file 303 and outputs it again via the graphic engine 202.

If the print command received by the dispatcher 301 from the graphic engine 202 is a print command issued from the despooler 305 to the graphic engine 202, the dispatcher 301 sends the print command to the printer driver 203 instead of the spooler 302.

The printer driver 203 forms a printer control command and outputs it to the printer 1500 via the system spooler 204.

FIG. 5 shows a correlation diagram between friendly names of printer drivers and hexadecimal numbers which are formed by CRC.exe. FIG. 6 shows an example of an INF file in Windows (registered trademark) 2000 which is used in the embodiment. FIG. 7 shows an example of an INF file in Windows NT40 (registered trademark) which is used in the embodiment. FIG. 8 shows necessity of system re-activation after the installation. A method of installing printer drivers from a printer folder of the OS which is preferable for the embodiment will be described in detail hereinbelow with reference to FIGS. 4 to 8.

FIG. 4 shows a schematic diagram of a printer driver installing method for explaining a whole construction of the embodiment. A method which shows the whole construction of the embodiment and whereby a name of a module set of a printer driver which is installed is changed in accordance with a predetermined rule upon installation will be described with reference to FIG. 4. The driver module set is included in an installation set and denotes a set of driver modules which forms a set in accordance with a predetermined relation.

A rename process of the driver as an element technique which is frequently used in the embodiment will be described first hereinbelow. In the embodiment, the names of the driver modules are changed in accordance with a predetermined rule upon installation. Hereinafter, "change the name" is also referred to as "rename". The renaming process is realized by a method whereby when a driver is installed into the host computer 3000 in FIG. 1, the installer stored in the HDD 11 in the host computer 3000 is loaded into the RAM 2 and by controlling the API (not shown) of the OS which is similarly loaded into the RAM 2, control is made so as to rename the name of the driver module. Naturally, in the case of a system such that the installer as an application directly permits the rename, the name can be directly renamed.

Subsequently, an example of the renaming process will be shown. For example, assuming that AAA.d11, BBB.d11, and CCC.d11 as a module set of the driver are targets of the rename upon installation of every model type, for example, when a printer driver of a model type "111" is installed, they are copied by names AAA__111.d11, BBB__111.d11, and CCC__111.d11 into the system directory of Windows (registered trademark), respectively. When a printer driver of a model type "222" is installed, they are copied by names AAA__222.d11, BBB__222.d11, and CCC__222.d11 into the system directory of the OS, respectively. When a printer driver of a model type "333" is installed, they are copied by names AAA__333.d11, BBB__333.d11, and CCC__333.d11 into the system directory of the OS, respectively.

In this instance, assuming that DDD.d11 and EEE.d11 are modules as rename non-targets upon installation of every model type, when the printer driver of the model type "111" is installed and when the printer driver of the model type "222" is installed, they are copied as DDD.d11 and EEE.d11 into the system directory of the OS, respectively.

Definitions of the printer driver module as a rename target and the printer driver module as a rename non-target will be described here. The printer driver module as a rename target is a module which provides fundamental functions of the driver and is a module which is continuously loaded into the system of the OS once the print is executed. For example, modules such as graphics driver (CNP5EE.DLL corresponds to it in the embodiment), user interface driver (CNP5EEUI.DLL corresponds to it in the embodiment), and resource file (CNP5E809.DLL corresponds to it in the embodiment) correspond to those modules. The printer driver module as a rename non-target is a model type common file such as color profile or help file and is a module which is unloaded from the system of the OS after completion of the print.

FIG. 5 is a table showing by which names the printer driver modules as rename targets are copied into the system directory of the OS. Specifically speaking, a hexadecimal number of four digits written in this table is added after each module name incorporated in the driver set. In this instance, "F0E5" is added to the module of a driver name "PrinterMakerA iR1600-2000 PCL5e", "617E" is added to the module of a driver name "PrinterMakerA iR2200-3300 PCL5e", "CA5C" is added to the module of a driver name "PrinterMakerA iR400 PCL5e", "9926" is added to the module of a driver name "PrinterMakerA iR5000-6000 PCL5e", "1579" is added to the module of a driver name "PrinterMakerA iR5000-6000-L1 PCL5e", "FAEA" is added to the module of a driver name "PrinterMakerA iR7200 PCL5e", and "D6F1" is added to the module of a driver name "PrinterMakerA iR7200-M1 PCL5e", respectively. "PrinterMakerA" denotes a name of a printer maker. "iR1600-2000" denotes a model name of a printer. "PCL" denotes a printer language. It is assumed that the driver names have been arranged in this order.

For example, in the case of the "PrinterMakerA iR1600-2000 PCL5e" driver, the graphics driver is "CNP5EE_F0E5.DLL", the user interface driver is "CNP5EEUI_F0E5.DLL", and the resource file is "CNP5E809_F0E5.DLL", respectively. In the case of the "PrinterMakerA iR7200 PCL5e" driver, the graphics driver is "CNP5EE_FAEA.DLL", the user interface driver is "CNP5EEUI_FAEA.DLL", and the resource file is "CNP5E809_FAEA.DLL", respectively.

In the case of the "PrinterMakerA iR5000-6000-L1 PCL5e" driver, those drivers are determined as follows: the graphics driver is "CNP5EE__1579.DLL"; the user interface driver is "CNP5EEUI__1579.DLL"; and the resource file is "CNP5E809__1579.DLL", respectively.

Numerals of those lower four digits (which can be expressed by four bits in the binary notation) are formed by a program tool called "CRC.exe". By using this tool, hexadecimal numbers of arbitrary four digits can be formed from the friendly name of the printer driver. For example, the reason why the end of "PrinterMakerA iR1600-2000 PCL5e" is not determined to be "111" from the beginning and the reason why the end of "PrinterMakerA iR7200 PCL5e" is not determined to be "222" from the beginning are because if they are determined from the beginning, hard coding such as a rename routine or the like having a table of the model names and the module change names is needed in the program and, each time a new model type is added, the program has to be corrected (added). It is also because as compared with the above case, if the driver module name is formed from the friendly name of the printer driver by using the tool, there is an effect such that a new model type can be added merely by correcting an INF file as an external file, which will be explained hereinlater.

Figure 19:
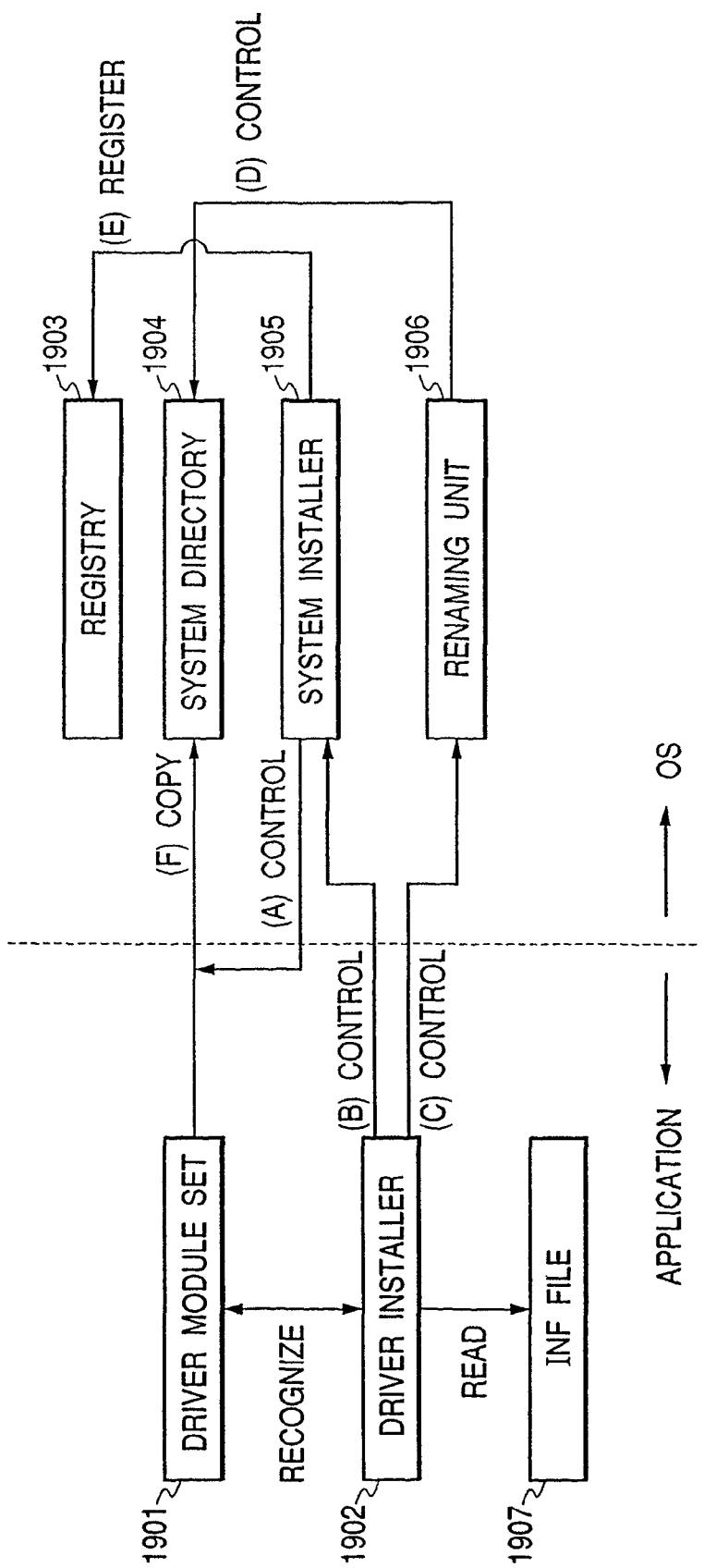
FIG. 19 is a block diagram showing an example of modules in a host computer 3000.

FIG. 19 is a diagram showing an example of the driver installer which has been stored in the HDD 11 of the host computer 3000 in FIG. 1, is read out into the RAM, and is executed and an example of the modules of the OS. Reference numeral 1901 denotes a driver module set in which drivers of a plurality of model types and names have been stored. The driver installer is a control program for installing the driver, reads out an INF file 1907 as a setting file for controlling the driver installer, and controls a system installer 1905 and a renaming unit 1906 of the OS in accordance with the read-out INF file 1907. Although "renaming unit" has been written here, a handling function of a general file of the OS, for example, functions such as file creation, file name change, file movement, and the like in the file system of the OS are referred to as a renaming unit 1906. By calling an API of the system installer 1905, a driver installer 1902 controls the system installer 1905, copies the driver module set into a system directory 1904 which is managed by the OS, and registers information of the module which is installed into a registry 1903. The registry is a data structure which is managed by the OS. By reading out such an area, the OS recognizes which driver is installed and how it has been set.

Subsequently, a describing method of the INF file for changing the name of the module set of the printer driver upon installation will be described. In this instance, when a predetermined character string "CRC.exe" is inputted, a hexadecimal number corresponding to the model name is formed by using a tool for forming the hexadecimal numbers which correspond to the predetermined character string in a one-to-one correspondence relational manner. It is now assumed that the friendly name is expressed by the printer maker name, model name, and printer language (printer language version name). The INF files in FIGS. 6 and 7 have been described for a specific OS. The INF files have been stored in the HDD 11 in FIG. 1 and correspond to 1907 in FIG. 19. The INF file is read out to the driver installer in response to the execution of the driver installer 1902. Samples of the INF files are as shown in FIGS. 6 and 7. When necessary portions among them are extracted, they are as follows.

```
;Identification #PCL5eUK
;IR8500: E287
;LBP-2000: 441B
[IR8500]
CNP5EE_E287. DLL CNP5EE. DLL
CNP5EEUI_E287. DLL CNP5EEUI. DLL
CNP5E809_E287. DLL CNP5E809. DLL
[IR8500_DATA]
DriverFile = CNP5EE_E287. DLL
ConfigFile = CNP5EEUI_E287. DLL
[LB2000]
CNP5EE_441B. DLL CNP5EE. DLL
CNP5EEUI_441B. DLL CNP5EEUI. DLL
CNP5E809_441B. DLL CNP5E809. DLL
[LB2000_DATA]
DriverFile = CNP5EE_441B. DLL
ConfigFile = CNP5EUI_441B. DLL
```

Explanation is added with respect to the foregoing INF file. IR8500 (iR8500) and LB2000 denote model names of certain printers. A state where the number E287 is made to correspond to IR8500 and the number 441B is made to correspond to LBP-2000 is shown here. Those numbers are formed by using "CRC.exe".

A character string surrounded by next square brackets [ ] is called a label. Contents of the label [IR8500] are confirmed in order to explain the model type IR8500. When the first line of the set contents of [IR8500] is read, the module written on the right side, that is, "CNP5EE.DLL" denotes a name of an original driver module incorporated in the driver set and the name written on the left side, that is, "CNP5EEUI_E287.DLL" denotes a name which is obtained after the renaming and copied to the system directory of the OS. That is, it means that the module "CNP5EE.DLL" stored in the installation set at present is copied as a name "CNP5EEUI_E287.DLL" and installed into the directory in which the module is installed. This is true of the modules (CNP5EEUI.DLL, CNP5E409. DLL) described on the second and third lines of the set contents of [IR8500].

Subsequently, set contents of the label [LB2000] will be examined in order to consider the model type LB2000. "CNP5EE.DLL" is disclosed so as to be copied as "CNP5EE_441B.DLL". This is true of the modules (CNP5EEUI. DLL, CNP5E409.DLL) disclosed on the second and third lines of the set contents of [LB2000].

By describing as mentioned above by an amount of only the corresponding model types, with respect to one module in the module set included in the driver module set, even if it is the common module, the module which is copied to the system directory of the OS is renamed and copied the number of times as many as the number of model types (CNP5EE_441B.DLL). That is, when explaining with respect to "CNP5EE.DLL", it is renamed to the module name "CNP5EEUI_E287.DLL" in the case of IR8500 and to the module name "CNP5EE_441B.DLL" in the case of LB2000 and, thereafter, it is copied to the system directory of the OS. Even in the case of the modules which have conventionally been managed as a common module in a plurality of model types, they are renamed to the different module names every model type and installed. Therefore, even if the version of the driver of the specific model type is upgraded, the driver of another model type which is not concerned with the version-up is not overwritten or the like and is not subjected to influence which the user does not desire.

FIG. 8 is a diagram showing that since a name of a rename target module is changed upon installation, the module set constructing the printer driver is installed every model type and the module sets are not mutually interfered, so that the necessity of the re-activation of the system after the installation decreases. It is one of the objects of the embodiment and one of the disadvantages of the format in which a plurality of corresponding model types are incorporated in one installation set is solved. If a plurality of corresponding model types are incorporated in one installation set, the existing module which has already been installed in the PC is also overwritten although the new printer driver is installed, so that it is necessary to re-activate the system after the installation. However, the following advantages are obtained by providing the invention of the embodiment.

As shown in a table of FIG. 8, if a "PrinterMakerA iR7200 PCL5ev5.30" driver as the same version is installed into a personal computer in which a "PrinterMakerA iR8500 PCL5ev5.30" driver has been installed, the module which is a fundamental function of the driver and is continuously loaded into the system of the OS once the print is executed in the case of the "PrinterMakerA iR8500 PCL5ev5.30" driver and that of the "PrinterMakerA iR7200 PCL5ev5.30" driver are made different by applying the embodiment. Therefore, the re-activation after the installation of the "PrinterMakerA iR7200 PCL5ev5.30" driver is unnecessary.

The module which is a fundamental function of the driver and is continuously loaded into the system of the OS once the print is executed even if a "PrinterMakerA iR7200 PCL5ev5.40" driver as a different version is installed in the same environment as that mentioned above in the case of the "PrinterMakerA iR8500 PCL5ev5.30" driver and that of the "PrinterMakerA iR7200 PCL5ev5.40" driver are made different by applying the embodiment of the invention. Therefore, the re-activation after the installation of the "PrinterMakerA iR7200 PCL5ev5.40" driver is unnecessary either.

The name of the module set of the printer driver to be installed is changed in accordance with the predetermined rule upon installation as mentioned above, so that not only the driver per model type of high developing efficiency can be formed but also the undesirable system re-activation can be minimized.

Modifications of the first embodiment will be described hereinbelow. In each of the following embodiments, a prerequisite of the installation is similar to that mentioned in the first embodiment, particularly, with respect to FIGS. 1 to 4 and FIG. 19. Therefore, portions different from the first embodiment will be mainly explained.

Second Embodiment

Since the prerequisite of the installation system is as mentioned in the first embodiment of FIGS. 1 to 4 and FIG. 19, its disclosure is omitted hereinbelow. In the following embodiment, another example of rename is disclosed. FIG. 9 is a table showing by which names the rename target printer driver modules are copied into the system directory of the OS. In the table, only graphics drivers are shown with respect to the driver target files. In FIG. 9, a rename format is "post-rename name=pre-rename name+"_"+model name".

For example, in the case of the "PrinterMakerA iR1600-2000 PCL5e" driver, the rename format is as follows. First, the graphics driver is "CNP5EE_PrinterMakerA iR1600-2000 PCL5e.DLL", the user interface driver is "CNP5EEUI_PrinterMakerA iR1600-2000 PCL5e.DLL", and the resource file is "CNP5E809_PrinterMakerA iR1600-2000 PCL5e.DLL", respectively.

In the case of the "PrinterMakerA iR7200 PCL5e" driver, the rename format is as follows. First, the graphics driver is "CNP5EE_PrinterMakerA iR7200 PCL5e.DLL", the user interface driver is "CNP5EEUI_PrinterMakerA iR7200 PCL5e.DLL", and the resource file is "CNP5E809_PrinterMakerA iR7200 PCL5e.DLL", respectively.

In the case of the "PrinterMakerA iR5000-6000-L1 PCL5e" driver, the graphics driver is "CNP5EE_PrinterMakerA iR5000-6000-L1 PCL5e.DLL", the user interface driver is "CNP5EEUI_PrinterMakerA iR5000-6000-L1 PCL5e. DLL", and the resource file is "CNP5E809_PrinterMakerA iR5000-6000-L1 PCL5e.DLL", respectively.

The position where the model name is added, a character string for connecting the pre-rename name and the model name, and the like are not important. It is important to add the model name. For example, it is also possible to use a method such as "post-rename name=pre-rename name+"@"+model name" or a method such as "post-rename name=model name+"_"+pre-rename name".

The reason why the name after the rename (post-rename name) is not determined from the beginning is because if it has been predetermined, hard coding is necessary in the program and the program has to be corrected (added) each time the model type is added. As compared with the above case, if the driver module name is formed from the model name of the printer driver, a new model type can be added merely by correcting the INF file as an external file and there is no need to correct the program.

Subsequently, a describing method of the INF file for changing the name of the module set of the printer driver upon installation will be described. Samples of the INF files are as shown in FIGS. 10 and 11. When necessary portions among them are extracted, they are as follows.

```
[PrinterMakerA]
"PrinterMakerA iR8500 PCL5e" = IR8500, PrinterMakerA
    IR8500 059D
[IR8500]
CopyFiles = IR8500_FILESPCL5E_FILES
DataFile = IR8500PK. XPD
DataSection = IR8500_DATA
[IR8500_DATA]
DriverFile = "CNP5EE_PrinterMakerA iR8500 PCL5e. DLL"
ConfigFile = "CNP5EEUI_PrinterMakerA iR8500 PCL5e.
    DLL"
HelpFile = CNP5EE. HLP
```

-continued

```
[IR8500_FILES]
"CNP5EE_PrinterMakerA iR8500 PCL5e. DLL" CNP5EE. DLL
"CNP5EEUI_PrinterMakerA iR8500 PCL5e. DLL" CNP5EEUI.
    DLL
"CNP5E809_PrinterMakerA iR8500 PCL5e. DLL" CNP5E809.
    DLL
```

In [IR8500_FILES] mentioned above, the name written on the right side indicates the name of the original driver module incorporated in the driver set and the name written on the left side indicates the post-rename name which is copied into the system directory of Windows (registered trademark). By describing the names of the number as many as the number of corresponding model types as mentioned above, even if there is one kind of module set incorporated in the driver set, as modules which are copied into the system directory of the OS, the modules of the number as many as the number of model types exist.

Third Embodiment

FIG. 12 is a table showing by which names the printer driver modules as rename targets are copied into the system directory of Windows (registered trademark). By adding GUID (Global Unique ID) to each rename target module, its name is changed. Since the GUID is formed every installation, it is a unique ID every installation. Therefore, the rename target module is not always renamed in accordance with the file name after the rename shown in FIG. 12 each time. FIG. 12 shows an example of the rename format. In FIG. 12, the rename format is "post-rename name=pre-rename name+"_"+GUID"

For example, the GUID as a preferred example of information having uniqueness can be formed by combining an address obtained by encoding an MAC address of a network card of the host computer and execution start time of the installation or the like.

For instance, in the case of the "PrinterMakerA iR1600-2000 PCL5e" driver, the graphics driver is "CNP5EE_1B3ADB36-3C65-4f8d-AFC9-AFB020463D5D.DLL", the user interface driver is "CNP5EEUI_1B3ADB36-3C65-4f8d-AFC9-AFB020463D5D.DLL", and the resource file is "CNP5E809_1B3ADB36-3C65-4f8d-AFC9-AFB020463D5D.DLL", respectively.

In the case of the "PrinterMakerA iR7200 PCL5e" driver, the graphics driver is "CNP5EE_D06A99AC-4BB7-44ed-AEC3-BEF2DBCB5BBC.DLL", the user interface driver is "CNP5EEUI_D06A99AC-4BB7-44ed-AEC3-BEF2DBCB5BBC.DLL", and the resource file is "CNP5E809_D06A99AC-4BB7-44ed-AEC3-BEF2DBCB5BBC.DLL", respectively.

In the case of the "PrinterMakerA iR5000-6000-L1 PCL5e" driver, the graphics driver is "CNP5EE_590C71FD-D88A-4e90-B72A-C40CBB73D28D. DLL", the user interface driver is "CNP5EEUI_590C71FD-D88A-4e90-B72A-C40CBB73D28D.DLL", and the resource file is "CNP5E809_590C71FD-D88A-4e90-B72A-C40CBB73D28D.DLL", respectively.

It is one of the important points that the model name and the version number are added rather a character string or the like connecting the pre-rename name and the GUID. For example, it is also possible to use a method such as "post-rename name=pre-rename name+"@"+GUID" or a method such as "post-rename name=GUID+"_"+pre-rename name".

Since the GUID is formed every installation, it is guaranteed that the post-rename name is unique. When the installer forms the GUID and renames and installs each module in accordance with the foregoing rule, it writes the GUID used for the rename into the registry. Since the post-rename name of the printer driver is dynamically and uniquely determined, it cannot be predetermined from the beginning. Therefore, the name of each of the renamed modules can be obtained by referring to the GUID written in the registry by the installer upon installation. Consequently, the correction of the program for adding the new model type is unnecessary.

Fourth Embodiment

FIG. 13 is a table showing by which names the rename target printer driver modules are copied into the system directory of the OS. In the table, only graphics drivers of version 5.30 are shown with respect to the driver target files.

In FIG. 13, a rename format is "post-rename name=pre-rename name+"_"+model name+"_"+version number".

For example, in the case of the "PrinterMakerA iR1600-2000 PCL5e" driver, the graphics driver (version 5.30) is "CNP5EE_PrinterMakerA iR1600-2000 PCL5e_530.DLL", the user interface driver (version 5.30) is "CNP5EEUI_PrinterMakerA iR1600-2000 PCL5e_530.DLL", and the resource file (version 5.30) is "CNP5E809_PrinterMakerA iR1600-2000 PCL5e_530.DLL", respectively.

In the case of the "PrinterMakerA iR7200 PCL5e" driver, the graphics driver is "CNP5EE_PrinterMakerA iR7200 PCL5e_530.DLL", the user interface driver is "CNP5EEUI_PrinterMakerA iR7200 PCL5e_530.DLL", and the resource file is "CNP5E809_PrinterMakerA iR7200 PCL5e_530.DLL", respectively.

In the case of the "PrinterMakerA iR5000-6000-L1 PCL5e" driver, the graphics driver (version 5.40) is "CNP5EE_PrinterMakerA iR5000-6000-L1 PCL5e_540.DLL", the user interface driver (version 5.40) is "CNP5EEUI_PrinterMakerA iR5000-6000-L1 PCL5e_540.DLL", and the resource file (version 5.40) is "CNP5E809_PrinterMakerA iR5000-6000-L1 PCL5e_540.DLL", respectively.

The position where the model name is added, the position where the version number is added, a character string for connecting the pre-rename name and the model name, and the like are not important. It is one of the important points that the model name and the version number are added. For example, it is also possible to use a method such as "post-rename name=pre-rename name+"@"+model name+"@"+version number" or a method such as "post-rename name=model name+"_"+version number+"_"+pre-rename name".

The reason why the name after the rename (post-rename name) is not determined from the beginning without using the model name and the version number is because if it has been predetermined, hard coding is necessary in the program and the program has to be corrected (added) each time the model type is added. As compared with the above case, if the driver module name is formed from the model name and the version number of the printer driver, a new model type can be added merely by correcting the INF file as an external file and there is no need to correct the program.

Subsequently, a describing method of the INF file for changing the name of the module set of the printer driver upon installation will be described. Samples of the INF files are as shown in FIGS. 14 and 15. When necessary portions among them are extracted, they are as follows.

```
[PrinterMakerA]
"PrinterMakerA iR8500 PCL5e" = IR8500, PrinterMakerA
    IR8500 059D
[IR8500]
CopyFiles = IR8500_FILESPCL5E_FILES
DataFile = IR8500PU. XPD
DataSection = IR8500_DATA
[IR8500_DATA]
DriverFile = "CNP5EE_PrinterMakerA iR8500 PCL5e_530.
    DLL"
ConfigFile = "CNP5EEUI_PrinterMakerA iR8500 PCL5e_530.
    DLL"
HelpFile = CNL4J. HLP
[IR8500_FILES]
"CNP5EE_PrinterMakerA iR8500 PCL5e_530. DLL" CNP5EE.
    DLL
"CNP5EEUI_PrinterMakerA iR8500 PCL5e_530. DLL"
    CNP5EEUI. DLL
"CNP5E409_PrinterMakerA iR8500 PCL5e_530. DLL"
    CNP5E409. DLL
```

In [IR8500_FILES] mentioned above, the name written on the right side indicates the name of the original driver module incorporated in the driver set and the name written on the left side indicates the post-rename name which is copied into the system directory of the OS. By describing the names of the number as many as the number of corresponding model types as mentioned above, even if there is one kind of module set incorporated in the driver set, as modules which are copied into the system directory of the OS, the modules of the number as many as the number of model types exist.

FIG. 8 is a diagram showing a state where when the names of the rename target modules are changed upon installation, the module set constructing the printer driver is installed every model type and they are not mutually interfered, so that the necessity of the system re-activation after the installation is reduced. It shows that one of the disadvantages of the format in which a plurality of corresponding model types are incorporated in one installation set can be solved. If a plurality of corresponding model types are incorporated in one installation set, the existing module which has already been installed in the PC is also overwritten although the new printer driver is installed, so that it is necessary to re-activate the system after the installation. However, such a problem is solved by the invention.

As shown in the table of FIG. 8, if the "PrinterMakerA iR7200 PCL5ev530" driver as the same version is installed into a personal computer in which the "PrinterMakerA iR8500 PCL5ev5.30" driver has been installed, the module which is a fundamental function of the driver and is continuously loaded into the system of Windows (registered trademark) once the print is executed in the case of the "PrinterMakerA iR8500 PCL5ev5.30" driver and that of the "PrinterMakerA iR7200 PCL5ev5.30" driver are different. Therefore, the re-activation after the installation of the "PrinterMakerA iR7200 PCL5ev5.30" driver is unnecessary. The module which is a fundamental function of the driver and is continuously loaded into the system of Windows (registered trademark) once the print is executed even if the "PrinterMakerA iR7200 PCL5ev5.40" driver as a different version is installed in the same environment as that mentioned above in the case of the "PrinterMakerA iR8500 PCL5ev5.30" driver and that of the "PrinterMakerA iR7200 PCL5ev5.40" driver are made different. Therefore, the re-activation after the installation of the "PrinterMakerA iR7200 PCL5ev5.40" driver is unnecessary either.

The name of the module set of the printer driver to be installed is changed in accordance with the model name and the version number of the printer driver as mentioned above, so that not only the driver per model type of high developing efficiency can be formed but also the undesirable system re-activation can be minimized.

As described above, according to the installing apparatus of the printer driver of the fourth embodiment, when the printer driver is installed into the information processing apparatus such as a personal computer or the like, the name of the module set to be installed is changed in accordance with the model name and the version number of the driver upon installation. Thus, the driver module set which is common to all corresponding model types can be installed by a different name per model type and per version. Therefore, not only the driver per model type and per version of very high developing efficiency can be formed but also the undesirable system re-activation can be almost completely prevented.

Fifth Embodiment

FIG. 16 is a table showing by which names the rename target printer driver modules are copied into the system directory of Windows (registered trademark). In FIG. 16, a rename format is "post-rename name=pre-rename name+"_"+numerical value described in printer driver data file". The printer driver data file is a file in which information to set the printer driver has been stored. A table corresponding to each driver module name for renaming mentioned above has been stored here.

For example, in the case of the "PrinterMakerA iR1600-2000 PCL5e" driver, the graphics driver is "CNP5EE_0.DLL", the user interface driver is "CNP5EEUI_0.DLL", and the resource file is "CNP5E809_0.DLL", respectively.

In the case of the "PrinterMakerA iR7200 PCL5e" driver, the graphics driver is renamed to "CNP5EE_5.DLL", the user interface driver is renamed to "CNP5EEUI_5.DLL", and the resource file is renamed to "CNP5E809_5.DLL", respectively.

In the case of the "PrinterMakerA iR5000-6000-L1 PCL5e" driver, the graphics driver is "CNP5EE_4.DLL", the user interface driver is "CNP5EEUI_4. DLL", and the resource file is "CNP5E809_4.DLL", respectively.

Those names obtained after the name change are also described in the driver data file. The name obtained after the name change which is described in the printer driver data file and the name obtained after the name change which is described in the INF file have to be certainly coincident. Consequently, since the printer driver can read out the names obtained after the name change from the driver data file, there is no need to hard-code the names obtained after the name change into the program. In other words, there is no need to correct (add) the program each time the model type is added. A new model type can be added merely by correcting the INF file as an external file and the driver data file.

Subsequently, a describing method of the INF file for changing the name of the module set of the printer driver upon installation will be described. Samples of the INF files are as shown in FIGS. 17 and 18. When necessary portions among them are extracted, they are as follows.

[IR8500]
IR8500PK. XPD
CNP5EE_8. DLL CNP5EE. DLL
CNP5EEUI_8. DLL CNP5EEUI. DLL

-continued

CNP5E809_8. DLL CNP5E809. DLL
[LB2000]
LB2000PK. XPD
CNP5EE_15. DLL CNP5EE. DLL
CNP5EEUI_15. DLL CNP5EEUI. DLL
CNP5E809_15. DLL CNP5E809. DLL

The name written on the right side indicates the name of the original driver module incorporated in the driver set and the name written on the left side indicates the post-rename name which is copied into the system directory of the OS. The printer driver data file mentioned above is "IR8500PK.XPD" or "LB2000PK.XPD". By describing the names of the number as many as the number of corresponding model types as mentioned above, even if there is one kind of module set incorporated in the driver set, as modules which are copied into the system directory of the OS, the modules of the number as many as the number of model types exist.

Other Embodiments

Although the case of installing the printer driver from a printer folder of the OS has been mentioned in the foregoing embodiments, it can be also installed by an installer which uniquely provides it. Specifically speaking, if the driver module name is changed on the basis of the driver INF in the installer which uniquely provides it and the driver module whose name has been changed is installed by the API of the OS, the installation per model type mentioned in the embodiments can be performed and substantially the same function as the installation from the printer folder of the OS can be provided.

Each of the processes in the embodiments can be executed by each apparatus such as client device, printer, or the like in accordance with a program which is installed from the outside. In such a case, the invention is also applied to a case where an information group including the program is supplied to the host computer from a memory medium such as CD-ROM, flash memory, FD, or the like or from an external memory medium via a network.

As mentioned above, naturally, the objects of the invention are accomplished by a method whereby the memory medium in which program codes of software for realizing the functions of the embodiments mentioned above have been recorded is supplied to a system or an apparatus or they are downloaded from an external server (not shown), so that a computer (or a CPU or an MPU) of the system or the apparatus reads out the program codes stored in the memory medium and executes them.

In such a case, the program codes themselves read out from the memory medium realize the novel functions of the invention and the memory medium in which the program codes have been stored constructs the invention. As a memory medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on a computer executes a part or all of actual processes on the basis of instructions of the program codes and the functions of the embodiments mentioned above are realized by those processes. Further, naturally, the invention incorporates a case where the program codes read out from the memory medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

Naturally, as shown in FIG. 8, the necessity of the re-activation is reduced by using the first to fifth embodiments mentioned above. For example, according to the installing apparatus of the printer driver in each of the embodiments of the invention, when the printer driver is installed into the information processing apparatus such by a personal computer or the like, the name of the module set to be installed is changed in accordance with the predetermined rule upon installation. Thus, the driver module set which is common to all of the corresponding model types can be installed as a different name per model type. Therefore, not only the driver per model type of high developing efficiency can be formed but also the undesirable system re-activation can be minimized.

As described above, according to one aspect of the invention, since the identification information of the driver module set is changed by using the identification information having uniqueness which is formed upon installation, the driver's undesirable overwrite updating process can be prevented.

What is claimed is:

1. A host computer which executes installation of an installation package comprising a first linked library control program for controlling by the host computer a first peripheral device, a second linked library control program for controlling by the host computer a second peripheral device and a common linked library control program commonly referred to by the first and second linked library control programs, said host computer comprising:
   a renaming unit constructed to, in an installation process of copying the common linked library control program included in the installation package to a specific directory of the host computer, rename a file name of a second copy of the common linked library control program (a) such that the file name of the second copy of the common linked library control program is different from that of a first copy of the common linked library control program which (i) has been installed into the host computer at the specific directory of the host computer and (ii) serves to control the first peripheral device, and (b) such that the file name is dependent (iii) on time information indicating time when the installation is executed or (iv) on the second peripheral device; and
   an installation unit constructed to install the second copy of the common linked library control program having the file name renamed by said renaming unit at the specific directory of the host computer, wherein the second copy of the common linked library control program is referred to by the second linked library control program for controlling the second peripheral device.

2. A host computer according to claim 1, wherein said installation unit installs the first and second copies of the common linked library control program as different linked library control programs having respective different file name for the first and second linked library control programs at the specific directory of the host computer, based on the file name of the second copy of the common linked library control program by said renaming unit.

3. A host computer according to claim 1, wherein said renaming unit renames the file name of the second copy of the common linked library control program based on information showing the second peripheral device.

4. A host computer according to claim 1, further comprising a forming unit constructed to form specific information dependent on the time information or on the second peripheral device, wherein said unit renames the file name of the second copy of the common linked library control program based on the specific information formed by said forming unit.

5. A host computer according to claim 1, wherein the file name of the second copy of the common linked library control program is a name of the second copy of the common linked library control program managed by an operating system provided in the host computer, and wherein the host computer further comprises a control unit constructed to control the operating system to rename the names of the first and second copies of the common linked library control program corresponding to the first and second peripheral devices, respectively, based on each of the file name renamed by said renaming unit.

6. A host computer according to claim 1, further comprising a recognition unit constructed to recognize a graphic driver module or a user interface driver module included in the common linked library control program, wherein, in order to rename the file name of the first or second copy of the common linked library control program recognized by said recognition unit, said renaming unit renames the file name of the first or second copy of the common linked library control program obtained after the renaming.

7. A host computer according to claim 1, wherein said renaming unit obtains file name different from that of the first copy of the common linked library control program and renames the file name of the second copy of the common linked library control program to be referred to by the second linked library control program based on the obtained file name.

8. A method for a host computer which executes installation of an installation package comprising a first linked library control program for controlling by the host computer a first peripheral device, a second linked library control program for controlling by the host computer a second peripheral device and a common linked library control program commonly referred to by the first and second linked library control programs, said method comprising the steps of:
   renaming, in an installation process of copying the common linked library control program included in the installation package to a specific directory of the host computer, rename a file name of a second copy of the common linked library control program (a) such that the file name of the second copy of the common linked library control program is different from that of a first copy of the common linked library control program module which (i) has been installed into the host computer at the specific directory of the host computer and (ii) serves to control the first peripheral device, and (b) such that the file name is dependent (iii) on time information indicating time when the installation is executed or (iv) on the second peripheral device; and
   installing the second copy of the common linked library control program having the file name renamed in said renaming step at the specific directory of the host computer, wherein the second copy of the common linked library control program is referred to by the second linked library control program for controlling the second peripheral device.

9. A method according to claim 8, wherein said installing step installs the first and second copies of the common linked library control program as different linked library control programs having respective different file name for the first and second linked library control programs at the specific directory of the host computer, based on the file name of the second copy of the common linked library control program renamed in said renaming step.

10. A method according to claim 8, wherein said renaming step renames the file name of the second copy of the common linked library control program based on information showing the second peripheral device.

11. A method according to claim 8, further comprising a step of forming specific information dependent on the time information or on the second peripheral device, wherein said renaming step renames the file name of the second copy of the common linked library control program based on the specific information formed in said forming step.

12. A method according to claim 8, wherein the file name of the second copy of the common linked library control program is a name of the second copy of the common linked library control program managed by an operating system provided in the host computer, and wherein said method further comprises a step of controlling the operating system to rename the names of the first and second copies of the common linked library control program corresponding to the first and second peripheral devices, respectively, based on each of the file name renamed in said renaming step.

13. A method according to claim 8, further comprising a step of recognizing a graphic driver module or a user interface driver module included in the common linked library control program, wherein, in order to rename the file name of the first or second copy of the common linked library control program recognized in said recognizing step, said renaming step renames the file name of the first or second copy of the common linked library control program obtained after the renaming.

14. A method according to claim 8, wherein said renaming step obtains file name different from that of the first copy of the common linked library control program and renames the file name of the second copy of the common linked library control program to be referred to by the second linked library control program based on the obtained file name.

15. A computer-readable memory medium storing a computer program for a host computer which executes installation of an installation package comprising a first linked library control program for controlling by the host computer a first peripheral device, a second linked library control program for controlling by the computer host a second peripheral device and a common linked library control program commonly referred to by the first and second linked library control programs, said program comprising the steps of:

renaming, in an installation process of copying the common linked library control program included in the installation package to a specific directory of the host computer, renames a file name of a second copy of the common linked library control program (a) such that the file name of the second copy of the common linked library control program is different from that of a first copy of the common linked library control program which (i) has been installed into the host computer at the specific directory of the host computer and (ii) serves to control the first peripheral device, and (b) such that the file name is dependent (iii) on time information indicating time when the installation is executed or (iv) on the second peripheral device; and installing the second copy of the common linked library control program having the file name renamed in said renaming step at the specific directory of the host computer, wherein the second copy of the common linked library control program is referred to by the second linked library control program for controlling the second peripheral device.

* * * * *